(12) United States Patent
Fujimoto et al.

(10) Patent No.: US 12,221,126 B2
(45) Date of Patent: Feb. 11, 2025

(54) NOTIFICATION CONTROL DEVICE, NOTIFICATION CONTROL METHOD, AND STORAGE MEDIUM

(71) Applicant: HONDA MOTOR CO., LTD., Tokyo (JP)

(72) Inventors: Gakuyo Fujimoto, Wako (JP); Misako Yoshimura, Wako (JP); Shigenobu Saigusa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 19 days.

(21) Appl. No.: 18/371,464

(22) Filed: Sep. 22, 2023

(65) Prior Publication Data

US 2024/0109549 A1 Apr. 4, 2024

(30) Foreign Application Priority Data

Sep. 29, 2022 (JP) ................. 2022-157039

(51) Int. Cl.
*B60W 50/14* (2020.01)
*G08G 1/16* (2006.01)

(52) U.S. Cl.
CPC ............. *B60W 50/14* (2013.01); *G08G 1/166* (2013.01); *B60W 2050/146* (2013.01); *B60W 2554/4026* (2020.02); *B60W 2554/404* (2020.02)

(58) Field of Classification Search
CPC .......... G08G 1/16; G08G 1/166; G08G 1/167; B60W 40/02; B60W 40/08; B60W 40/09; B60W 40/105; B60W 50/00; B60W 50/10; B60W 50/14; B60W 2050/143; B60W 2050/146; B60W 2554/4026; B60W 2554/404

See application file for complete search history.

(56) References Cited

U.S. PATENT DOCUMENTS

| 11,787,416 B2* | 10/2023 | Huai ..................... G06F 18/217 |
| | | 701/27 |
| 2015/0284010 A1* | 10/2015 | Beardsley ............ G08G 5/0013 |
| | | 701/1 |
| 2020/0133282 A1* | 4/2020 | Choi ..................... B60W 30/09 |
| 2021/0188090 A1* | 6/2021 | Kim ........................ G06F 3/0482 |

FOREIGN PATENT DOCUMENTS

JP 2015-087990 5/2015

* cited by examiner

*Primary Examiner* — Van T Trieu
(74) *Attorney, Agent, or Firm* — Amin, Turocy & Watson, LLP

(57) ABSTRACT

A control device performs: setting a moving area including a trajectory along which a mobile object is scheduled to move with behavior of the mobile object and a surrounding area when the mobile object moves straight, turns right, or turns left; controlling an information provision device configured to provide a driver with information such that the driver is notified of presence of a first type of object when a first type of object is present in the surrounding area and the driver does not see the first type of object; and controlling the information provision device such that the driver is re-notified of the first type of object when the first type of object is present in the moving area and the driver does not see the first type of object after the driver has seen the first type of object through the notification.

10 Claims, 20 Drawing Sheets

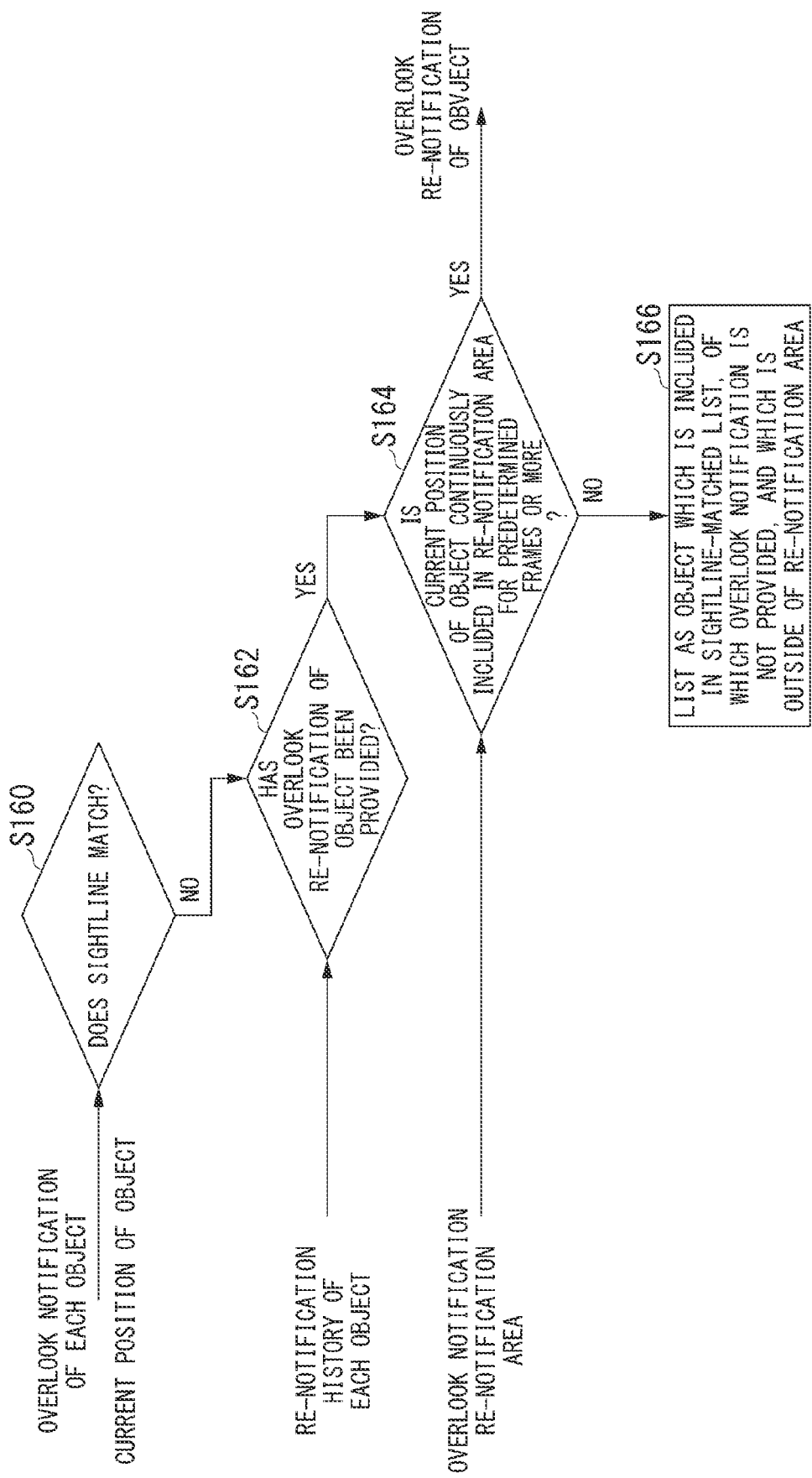

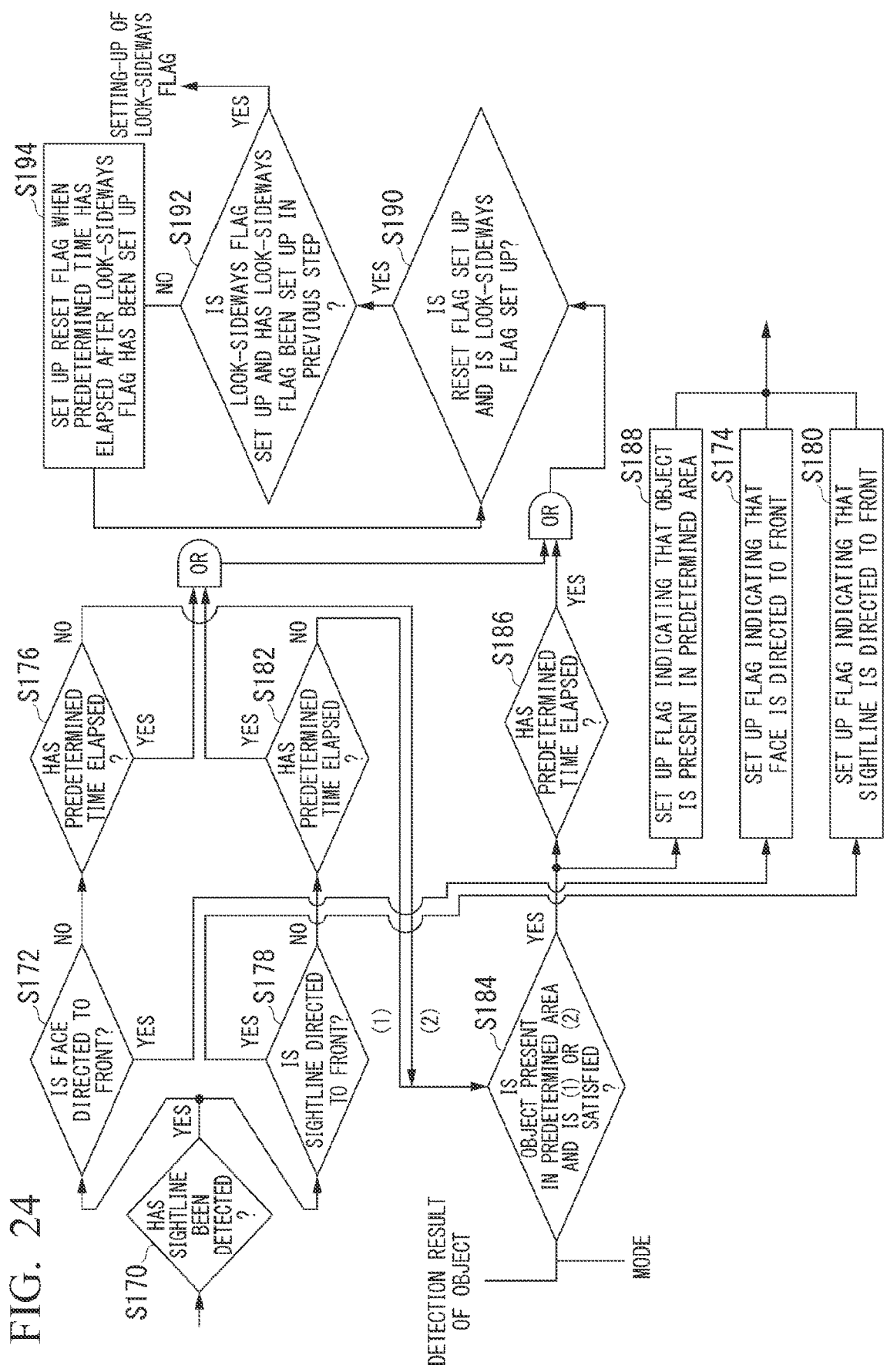

NOTIFICATION CONTROL DEVICE, NOTIFICATION CONTROL METHOD, AND STORAGE MEDIUM

CROSS-REFERENCE TO RELATED APPLICATION

Priority is claimed on Japanese Patent Application No. 2022-157039, filed Sep. 29, 2022, the content of which is incorporated herein by reference.

BACKGROUND

Field

The present invention relates to a notification control device, a notification control method, and a storage medium.

Description of Related Art

In the related art, a driving support device including an object determining means configured to determine whether an object with which contact is to be avoided is present in a predetermined crossing area including a crossing and the vicinity thereof and whether a vehicle is approaching the object in the crossing area and a warning issuing means configured to issue a warning for prompting a driver to visually confirm the object when it is determined that the vehicle is in a predetermined low-speed state and the object determining means determines that the vehicle is approaching the object in the crossing area is disclosed (Japanese Unexamined Patent Application, First Publication No. 2015-87990).

SUMMARY

In the related art, notification is not suitably performed. The present invention was made in consideration of the aforementioned circumstances and an objective thereof is to provide a notification control device, a notification control method, and a storage medium that can provide a more appropriate notification with regard to a nearby object.

A notification control device, a notification control method, and a storage medium according to the present invention employ the following configurations.

(1) According to an aspect of the present invention, a notification control device is provided including a storage medium storing computer-readable instructions and at least one processor connected to the storage medium, wherein the at least one processor executes the computer-readable instructions to perform: setting a moving area including a trajectory along which a mobile object is scheduled to move with behavior of the mobile object and a surrounding area near the mobile object when the mobile object moves straight, turns right, or turns left; controlling an information provision device configured to provide a driver of the mobile object with information such that the driver is notified of presence of a first type of object when a first type of object is present in the surrounding area and the driver does not see the first type of object; and controlling the information provision device such that the driver is re-notified of the first type of object when the first type of object is present in the moving area and the driver does not see the first type of object after the driver has seen the first type of object through the notification.

(2) In the aspect of (1), the at least one processor may execute the computer-readable instructions to perform: controlling the information provision device such that the driver is notified of the presence of a second type of object moving faster than the first type of object when the second type of object is predicted to be present in the surrounding area from another area after a first predetermined time elapses and the driver does not see the second type of object; and controlling the information provision device such that the driver is re-notified of the second type of object when the second type of object is predicted to be present in the moving area and the driver does not see the second type of object in a second predetermined time from a time point at which the notification has been performed or the second type of object has been seen after the driver has seen the second type of object through the notification.

(3) In the aspect of (1) or (2), the at least one processor may execute the computer-readable instructions to perform: stopping the notification when the driver sees the first type of object after the notification and continuously performing the notification when the driver does not see the first type of object after the notification.

(4) In the aspect of (4), the at least one processor may execute the computer-readable instructions to perform: setting an area including a lane in which the mobile object moves as the moving area when the mobile object moves straight; and setting a length of the moving area on the basis of a speed of the mobile object, and the surrounding area may include a lane or a walkway adjacent to the lane.

(5) In the aspect of (4), the at least one processor may execute the computer-readable instructions to perform: setting a moving area, which has a larger width than the moving area when the mobile object moves straight, with respect to the mobile object when the mobile object turns right; setting a length of the moving area on the basis of the speed of the mobile object; and setting the surrounding area on the right side of the moving area, on the right side of the mobile object, and on the right-rear side of the mobile object with respect to a traveling direction of the mobile object.

(6) In the aspect of (4), the at least one processor may execute the computer-readable instructions to perform: setting a moving area, which has a larger width than the moving area when the mobile object moves straight, with respect to the mobile object when the mobile object turns left; setting a length of the moving area on the basis of the speed of the mobile object; and setting the surrounding area on the left side of the moving area, on the left side of the mobile object, and on the left-rear side of the mobile object with respect to a traveling direction of the mobile object.

(7) In the aspect of (3), the at least one processor may execute the computer-readable instructions to perform: recognizing an object and tracking the recognized object; adding identification information to the recognized first type of object, adding notification information indicating that notification has been performed to the identification information of the first type of object when the driver is notified of presence of the first type of object, and generating correlation information in which the identification information of the first type of object and the notification information are correlated; and controlling the information provision device such that the driver is re-notified of the first type of object when the first type of object is present in the moving area, the driver does not see the first type of object, and the notification information has been added to the first type of object in the correlation information after the driver has seen the first type of object through the notification.

(8) In the aspect of (3), the at least one processor may execute the computer-readable instructions to perform: recognizing an object and tracking the recognized object; adding identification information to the recognized second type of object moving faster than the first type of object, adding notification information indicating that notification has been performed to the identification information of the second type of object when the driver is notified of presence of the second type of object, and generating correlation information in which the identification information of the second type of object and the notification information are correlated; and controlling the information provision device such that the driver is re-notified of the second type of object when the second type of object is predicted to move to the moving area, the driver does not see the second type of object, and the notification information has been added to the second type of object in the correlation information after the driver has seen the second type of object through the notification.

(9) According to another aspect of the present invention, a notification control method is provided which is performed by a computer, the notification control method including: setting a moving area including a trajectory along which a mobile object is scheduled to move with behavior of the mobile object and a surrounding area near the mobile object when the mobile object moves straight, turns right, or turns left; controlling an information provision device configured to provide a driver of the mobile object with information such that the driver is notified of presence of a first type of object when the first type of object is present in the surrounding area and the driver does not see the first type of object; and controlling the information provision device such that the driver is re-notified of the first type of object when the first type of object is present in the moving area and the driver does not see the first type of object after the driver has seen the first type of object through the notification.

(10) According to another aspect of the present invention, a non-transitory computer-readable storage medium is provided which stores a program, the program causing a computer to perform: a process of setting a moving area including a trajectory along which a mobile object is scheduled to move with behavior of the mobile object and a surrounding area near the mobile object when the mobile object moves straight, turns right, or turns left; a process of controlling an information provision device configured to provide a driver of the mobile object with information such that the driver is notified of presence of a first type of object when a first type of object is present in the surrounding area and the driver does not see the first type of object; and a process of controlling the information provision device such that the driver is re-notified of the first type of object when the first type of object is present in the moving area and the driver does not see the first type of object after the driver has seen the first type of object through the notification.

According to the aspects of (1) to (10), it is possible to more appropriately perform notification about a nearby object. This is because, for example, re-notification is performed when an object is present in the moving area after the driver has visually ascertained the object through notification.

According to the aspect of (2), it is possible to perform appropriate notification about a second type of object which is present at a position separated from a mobile object.

BRIEF DESCRIPTION OF THE DRAWINGS

FIG. 23 is a diagram showing a process of selecting an object of re-notification.

FIG. 24 is a diagram showing a look-sideways determining process.

DETAILED DESCRIPTION

Hereinafter, a notification control device, a notification control method, and a storage medium according to an embodiment of the present invention will be described with reference to the accompanying drawings. In the following description, a mobile object is assumed to be a vehicle, but a mobile object may be an object other than a vehicle.

First Embodiment

Entire Configuration

Figure 1:
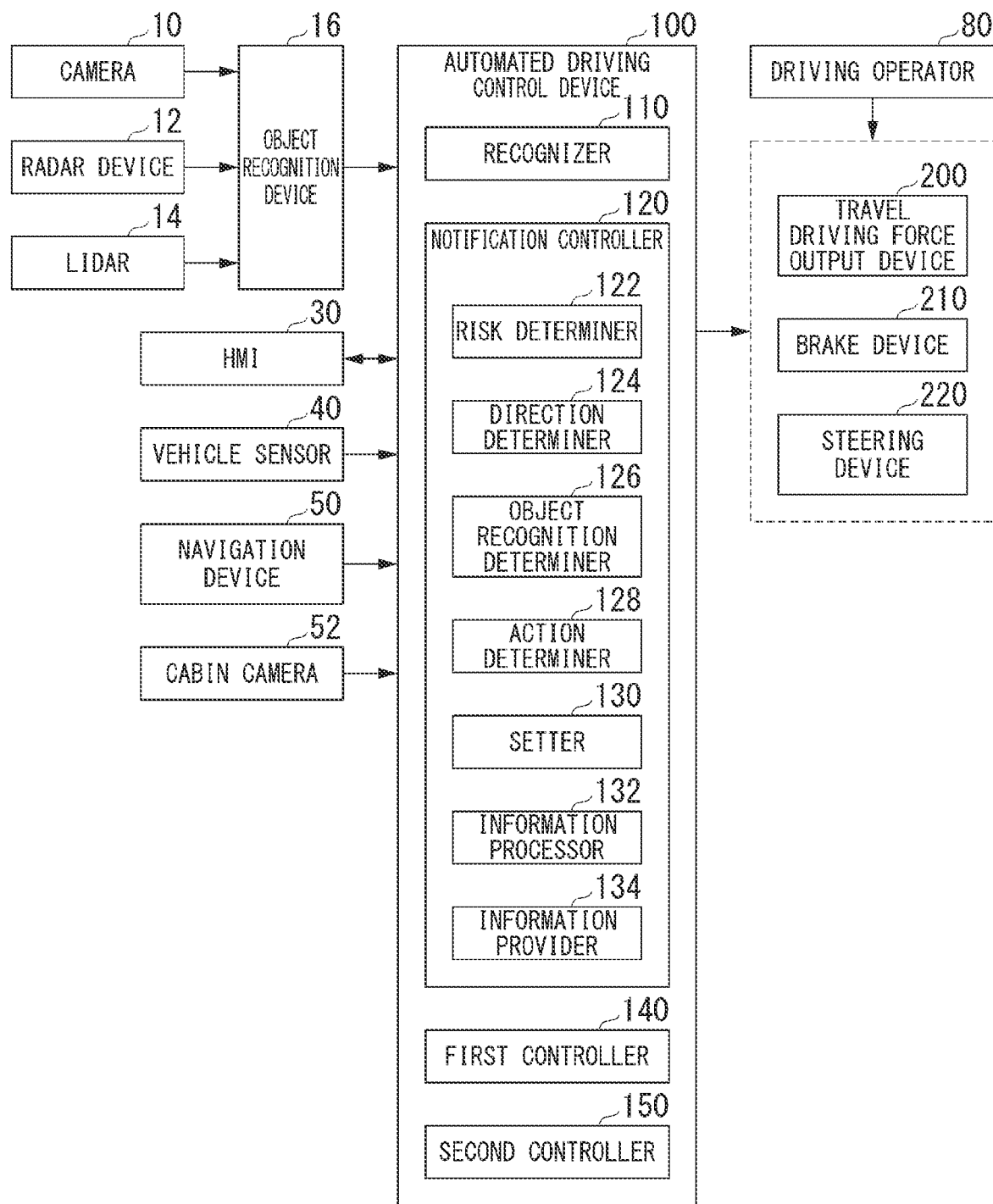
FIG. 1 is a diagram showing a configuration of a vehicle M in which a driving support device according to an embodiment is mounted.

FIG. 1 is a diagram showing a configuration of a vehicle M in which a driving support device 100 according to an embodiment is mounted. A vehicle M is, for example, a vehicle with two wheels, three wheels, or four wheels, and a drive source thereof is an internal combustion engine such as a diesel engine or a gasoline engine, an electric motor, or a combination thereof. The electric motor operates using electric power generated by a power generator connected to the internal combustion engine or electric power discharged from a secondary battery or a fuel cell.

For example, a camera 10, a radar device 12, a Light Detection and Ranging (LIDAR) 14, an object recognition device 16, a human-machine interface (HMI) 30, a vehicle sensor 40, a cabin camera 52, a driving operator 80, a driving support device 100, a travel driving force output device 200, a brake device 210, and a steering device 220 are mounted in the vehicle M. These devices or instruments are connected to each other via a multiplex communication line such as a controller area network (CAN) communication line, a serial communication line, a radio communication network, or the like. The configuration shown in FIG. 1 is only an example, and part of the configuration may be omitted or another configuration may be added thereto.

The camera 10 is, for example, a digital camera using a solid-state imaging device such as a charge coupled device (CCD) or a complementary metal oxide semiconductor (CMOS). The camera 10 is attached to an arbitrary position on a vehicle (hereinafter referred to as a vehicle M) in which a vehicle system 1 is mounted. The camera 10 includes, for example, a camera imaging a front view, a camera imaging a left-front view, a camera imaging a right-front view, a camera imaging a left-rear view, and a camera imaging a right-rear view. For example, the camera 10 imaging a front view is attached to an upper part of a front windshield, a rear surface of a rearview mirror, or the like. For example, the camera imaging a left-front view is attached to a left A pillar, the vicinity of the A pillar, the vicinity of a left sideview mirror, or the like, the camera imaging a right-front view is attached to a right A pillar, the vicinity of the A pillar, the vicinity of a right sideview mirror, or the like, the camera imaging a left-rear view is attached to a left C pillar, the vicinity of the C pillar, or the like, and the camera imaging a right-rear view is attached to a right C pillar, the vicinity of the C pillar, or the like. The positions to which these cameras are attached are not particularly limited as long as the cameras can image corresponding imaging areas. The camera 10 images the surroundings of the vehicle M, for example, periodically and repeatedly. The camera 10 may be a stereoscopic camera.

The radar device 12 detects at least a position (a distance and a direction) of an object by radiating radio waves such as millimeter waves to the surroundings of the vehicle M and detecting radio waves (reflected waves) reflected by the object. The radar device 12 is attached to an arbitrary position on the vehicle M. The radar device 12 may detect a position and a speed of an object using a frequency modulated continuous wave (FM-CW) method. The radar device 12 may be attached to, for example, the vicinities of the positions to which the cameras are attached. For example, the camera 10 and the radar device 12 may be attached as a pair.

The LIDAR device 14 radiates light (or electromagnetic waves of wavelengths close to light) to the surroundings of the vehicle M and measures scattered light. The LIDAR device 14 detects a distance to an object on the basis of a time period from radiation of light to reception of light. The radiated light is, for example, a pulse-like laser beam. The LIDAR device 14 is attached to an arbitrary position on the vehicle M.

The object recognition device 16 performs a sensor fusion process on results of detection from some or all of the camera 10, the radar device 12, and the LIDAR device 14 and recognizes a position, a type, a speed, and the like of an object. The object recognition device 16 outputs the result of recognition to the driving support device 100. The object recognition device 16 may output the results of detection from the camera 10, the radar device 12, and the LIDAR device 14 to the driving support device 100 without any change. The object recognition device 16 may be omitted from the vehicle system 1. Some or all of the camera 10, the radar device 12, the LIDAR device 14, and object recognition device 16 are examples of a "detection device."

The HMI 30 presents various types of information to an occupant of the vehicle M and receives an input operation from the occupant. The HMI 30 includes various types of display devices, a speaker, a buzzer, a vibration generator (a vibrator), a touch panel, a switch, and keys. The vibration generator causes a seat belt of a driver's seat to vibrate or causes a steering wheel to vibrate, for example, under the control of the driving support device 100. The HMI is an example of an "information provision device" or an "information output device."

The vehicle sensor 40 includes a vehicle speed sensor detecting a speed of the vehicle M, an acceleration sensor detecting an acceleration, a yaw rate sensor detecting an angular velocity around a vertical axis, and a direction sensor detecting a direction of the vehicle M.

A navigation device 50 includes, for example, a global navigation satellite system (GNSS) receiver, a guidance controller, and a storage storing map information. The GNSS receiver identifies a position of the vehicle M on the basis of signals received from GNSS satellites. The position of the vehicle M may be identified or complemented by an inertial navigation system (INS) using the output of the vehicle sensor 40. For example, the guidance controller determines a route from the position of the vehicle M identified by the GNSS receiver (or an input arbitrary position) to a destination input by an occupant with reference to the map information and causes the HMI 30 to output guidance information such that the vehicle M travels along the route. The map information is, for example, information in which a road shape is expressed by links indicating a road and nodes connected by the inks. The map information may include a curvature of a road and point of interest (POI) information. The navigation device 50 may transmit a current position and a destination of the vehicle M to a navigation server via a communication device and acquire a route from the navigation server.

The cabin camera 52 is, for example, a digital camera using a solid-state imaging device such as a CCD or a CMOS. The cabin camera 52 is attached to a position on the vehicle M at which an occupant (for example, a driver sitting on a driver's seat) of the vehicle M can be imaged. For example, the cabin camera 52 images an imaging area with a predetermined period.

The driving operator 80 includes, for example, an accelerator pedal, a brake pedal, a steering wheel, a shift lever, and other operators. A sensor detecting an amount of operation or whether an operation has been performed is attached to the driving operator 80. Results of detection from the sensor are output to some or all of the travel driving force output device 200, the brake device 210, and the steering device 220.

The travel driving force output device 200 outputs a travel driving force (a torque) for allowing the vehicle to travel to driving wheels. The travel driving force output device 200 includes, for example, a combination of an internal combustion engine, an electric motor, and a transmission and an electronic control unit (ECU) that controls them. The ECU controls the elements on the basis of information input from the driving support device 100 or information input from the driving operator 80.

The brake device 210 includes, for example, a brake caliper, a cylinder that transmits a hydraulic pressure to the brake caliper, an electric motor that generates a hydraulic pressure in the cylinder, and an ECU. The ECU controls the electric motor on the basis of the information input from the driving support device 100 or the information input from the driving operator 80 such that a brake torque based on a braking operation is output to vehicle wheels. The brake device 210 may include a mechanism for transmitting a hydraulic pressure generated by an operation on the brake pedal included in the driving operator 80 to the cylinder via a master cylinder as a backup. The brake device 210 is not limited to the above-mentioned configuration, and may be an electronically controlled hydraulic brake device that controls an actuator on the basis of the information input from the driving support device 100 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the driving support device 100 or the information input from the driving operator 80 to change the direction of the turning wheels. For example, the steering device 220 or the steering wheel may serve as an "information provision device" or an "information output device" that notifies or informs the driver of information. For example, when avoidance of a risky object which will be described later is proposed to a user by rotating the steering wheel or temporarily fixing the steering wheel to a position to which the steering wheel rotates by a predetermined angle, the steering device or the steering wheel serves as an "information provision device" or an "information output device."

Driving Support Device

The driving support device 100 includes, for example, a recognizer 110, a notification controller 120, a first controller 140, and a second controller 150. The notification controller 120 includes, for example, a risk determiner 122, a direction determiner 124, an object recognition determiner 126, an action determiner 128, a setter 130, an information processor 132, and an information provider 134. These functional units are realized, for example, by causing a hardware processor such as a central processing unit (CPU) to execute a program (software). Some or all of such elements may be realized by hardware (a circuit part including circuitry) such as a large scale integration (LSI) device, an application-specific integrated circuit (ASIC), or a field-programmable gate array (FPGA), or a graphics processing unit (GPU) or may be cooperatively realized by software and hardware. The program may be stored in a storage device (a storage device including a non-transitory storage medium) such as an HDD or a flash memory of the driving support device 100 in advance or may be stored in a removable storage medium such as a DVD or a CD-ROM and installed in the HDD or the flash memory of the driving support device 100 by attaching the removable storage medium (a non-transitory storage medium) to a drive device.

Settings in the travel driving force output device 200, the brake device 210, and the steering device 220 are performed such that instructions for the travel driving force output device 200, the brake device 210, and the steering device 220 from the driving support device 100 are executed with higher priority than the results of detection from the driving operator 80. When a braking force based on an amount of operation on the brake pedal is greater than an instruction from the driving support device 100, braking may be set such that the former is preferentially executed. As a structure for preferentially executing the instruction from the driving support device 100, a communication priority in an onboard LAN may be used.

Process when Risky Object is Present

When a risky object is present in front of the vehicle M, the driving support device 100 performs various types of processes on the basis of an index value indicating a degree of closeness of the vehicle M to the risky object and threshold values.

The "degree of closeness" is expressed by various index values indicating a degree of closeness between objects. For example, the "degree of closeness" is a time-to-collision (TTC) which is an index value calculated by dividing a distance by a relative speed (a direction in which the objects approach each other is defined as positive). When the relative speed is negative (a direction in which the objects are separated from each other), the TTC is set to the infinite. The TTC is an index value indicating that the "degree of closeness" is higher as the value thereof becomes lower. When a "first condition" is satisfied, it means, for example, that the TTC is less than a first threshold value Th1. The first threshold value Th1 is, for example, about 1 comma number [sec]. Instead of the TTC, an index value having the same characteristics such as vehicle time headway (THW) or another index value may be used as the "degree of closeness." A TTC adjusted in consideration of acceleration or jerk may be used as the "degree of closeness." In the following description, the "degree of closeness" is assumed to be the TTC.

A risky object is, for example, an object which is to be avoided by the vehicle M. Examples of the risky object include an object interfering with the vehicle M when the vehicle moves in a current state and an object with a likelihood of interference. The object with a likelihood of interference is, for example, an object of which a degree of closeness after a predetermined time period is equal to or greater than a predetermined degree in consideration of a position, a moving direction, and a moving speed of the object and a position, a moving method, and a moving speed of the vehicle M. The object may be a traffic participant such as a pedestrian, a bicycle, or a vehicle or an object other than a traffic participant, such as an object placed on a road or a fallen object.

The recognizer 110 recognizes a risky object near the vehicle M on the basis of the information input from the object recognition device 16. Recognition means, for example, that a risky object classified as described above is present and thus a relative position of the risky object with respect to the vehicle M is recognized. For example, the recognizer 110 tracks the recognized object.

The risk determiner 122 determines a direction in which there is a risk, for example, on the basis of the position of the risky object. For example, the risk determiner 122 determines that a risk is present in front of the vehicle M when a risky object is present in front of the vehicle M.

For example, the direction determiner 124 analyses an image captured by the cabin camera 52 and determines a direction of a driver's face or a direction of a driver's sightline on the basis of the result of analysis.

The object recognition determiner 126 determines (estimates) whether the driver has seen the risky object. For example, information indicating a correlation between a driver's sightline direction (an effective field of view in the sightline direction) in an image and a position of an object with respect to the vehicle M is stored in the storage device of the driving support device 100 in advance. The object recognition determiner 126 determines whether the determined sightline direction in the image matches a direction of a position of a risky object with reference to the information indicating the correlation, determines that the driver sees the risky object when both match, and determines that the driver does not see the risky object when both do not match. For example, when the driver sees a sideview mirror or a lateral side (when the sightline or the face faces the sideview mirror or the lateral side), it is determined that the driver has seen an object supposed to appear in the sideview mirror or an object present on the lateral side. The object recognition determiner 126 may derive a score based on the number of matching times or the time of matching and determine that the driver has seen the risky object when the score is equal to or greater than a threshold value. For example, when the driver sees the rearview mirror (when the sightline faces the rearview mirror), it may be determined that the driver has seen an object supposed to appear in the rearview mirror. Instead of the aforementioned process, whether the driver has seen the risky object may be determined using a predetermined algorithm.

The action determiner 128 determines an action of the driver. The action is, for example, an operation state of the accelerator pedal, an operation state of the steering wheel, or an operation state of the brake pedal. The action determiner 128 determines the action of the driver, for example, on the basis of results of detection from a sensor detecting amounts of operation of the accelerator pedal, the brake pedal, and the steering wheel or whether an operation is performed.

The setter 130 sets an area for a mobile object M according to behavior of the mobile object M. Details for setting of the area will be described later.

The information processor 132 adds identification information to the object recognized by the recognizer 110. The information processor 132 adds information indicating whether the driver has seen the object, information indicating whether notification has been performed, or information indicating whether re-notification has been performed to the identification information of the object. The information processor 132 generates and manages information (which is an example of "correlation information") in which the identification information of the object is correlated with information indicating a processing result from the driving support device 100 as described above. This information is stored in the storage device of the driving support device 100. The information processor 132 predicts a future position of the object on the basis of a position or a position change of the object recognized by the recognizer 110.

The information provider 134 provides information on the basis of the determination result from the object recognition determiner 126, the determination result from the action determiner 128, the processing result from the setter 130, the processing result from the information processor 132, and the like. For example, notification or warning is output. Details thereof will be described later.

Notification Timing

Figure 2:
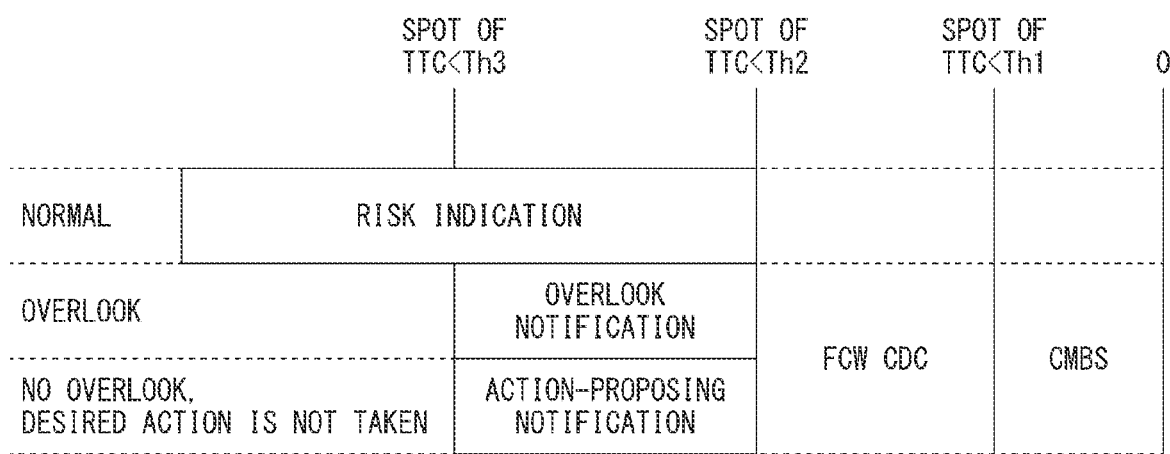
FIG. 2 is a diagram showing a notification timing when a risky object is present.
Figure 3:
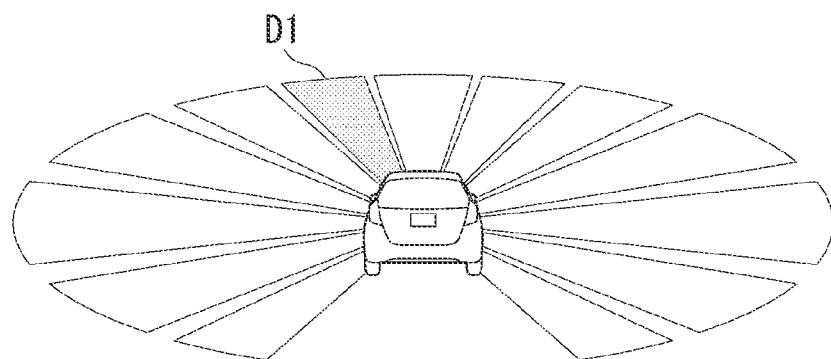
FIG. 3 is a diagram showing an example of a risk indication.

FIG. 2 is a diagram showing a notification timing at which a risky object is present. When a risky object is present, the information provider 134 displays a risk indication indicating a direction in which the risky object is present on a display. FIG. 3 is a diagram showing an example of a risk indication. For example, as shown in FIG. 3, contents with which a direction (D1 in the drawing) in which a risky object is present with respect to the vehicle M can be recognized are displayed. The information provider 134 provides the risk indication to the driver, for example, until the TTC reaches a second threshold value Th2. The second threshold value Th2 is, for example, about 3 [sec] or less or greater than about 3 [sec]. The risk indication, an overlook notification which will be described later, and an action-proposing notification which will be described later are an example of a "third process."

Figure 4:
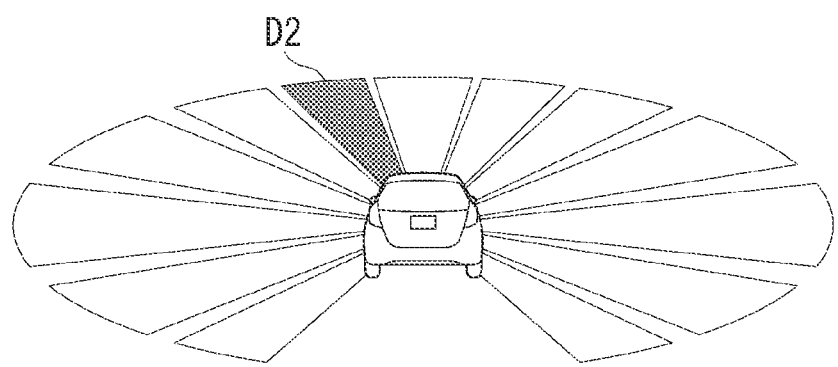
FIG. 4 is a diagram showing an example of overlook notification.

The information provider 134 provides an overlook notification when the driver does not see a risky object until the TTC reaches a third threshold value Th3. The overlook notification is a notification for notifying that the driver is not seeing the risky object. FIG. 4 is a diagram showing an example of an overlook notification. For example, as shown in FIG. 4, contents with which a direction (D2 in the drawing) in which a risky object is present with respect to the vehicle M can be recognized are displayed. For example, a direction in which the risky object is present is notified in a more emphasized mode than the mode shown in FIG. 3. The emphasized mode may be, for example, a mode in which the driver becomes more likely to face a direction in which a more risky object is present such as emphasis by a color or emphasis by flicking or turning on an icon or the like. For example, the information provider 134 provides an overlook notification to the driver from a time point at which the TTC has reached the third threshold value Th3 to a time point at which the TTC has reached the second threshold value Th2. For example, the overlook notification is continuously provided even if a risky object is seen when the TTC is between the third threshold value Th3 and the second threshold value Th2. The third threshold value Th3 is, for example, about 4 [sec] or less or greater than about 4 [sec].

The information provider 134 provides an action-proposing notification (a fourth process) when the driver sees a risky object (when it is estimated that the driver has seen a risky object) and the driver does not perform a predetermined action until the TTC reaches the third threshold value Th3. The action-proposing notification is a notification for proposing that the driver perform an action to avoiding the risky object. The information provider 134 provides the action-proposing notification to the driver, for example, from a time point at which the TTC reaches the third threshold value Th3 to a time point at which the TTC reaches the second threshold value Th2. For example, the action-proposing notification is continuously provided even if the driver performs an action based on the action-proposing notification when the TTC is between the third threshold value Th3 and the second threshold value Th2.

The predetermined action is, for example, an action corresponding to deceleration or turning. The predetermined action means, for example, that the brake pedal is operated or that the steering wheel (an operator for performing steering) is operated in the direction in which a risky object is avoided. The predetermined action means that an amount of operation on the accelerator pedal is less by a predetermined value than the amount of operation before a predetermined time or that an operation on the accelerator pedal is released. Release means that the driver stops the operation on the accelerator pedal such that the amount of operation is zero or close to zero.

Figure 5:
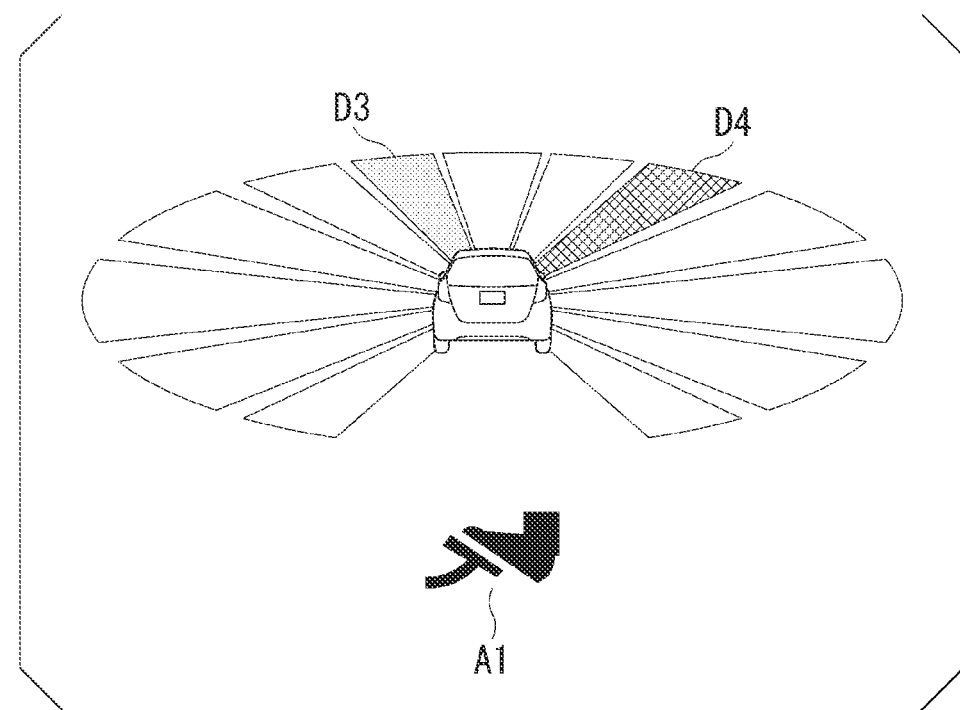
FIG. 5 is a diagram showing an example of action-proposing notification.

FIG. 5 is a diagram showing an example of the action-proposing notification. For example, as shown in FIG. 5, contents with which a direction (D3 in the drawing) in which a risky object is present with respect to the vehicle M can be recognized as shown in FIG. 3 (or FIG. 4) are displayed. As shown in FIG. 5, contents with which a direction (D4 in the drawing) in which the vehicle M travels to avoid the risky object can be recognized by the driver are displayed. The contents include information indicating an action to be performed by the driver as the action-proposing notification. In FIG. 5, an icon (A1 in the drawing) for prompting the driver to operate the brake pedal to decelerate the vehicle is displayed.

The action-proposing notification may not be an indication, but may be a notification based on speech, voice, sound, a notification (a notification based on fixing the steering wheel to a position at which the steering wheel rotates by a predetermined angle in a direction parallel to the traveling direction or a notification based on rotating the steering wheel by a predetermined angle or returning the steering wheel to the original position) based on the driver's recognizing a traveling direction by automatically steering the steering wheel in a progress direction, a notification by strengthening a binding force of a seat belt by controlling a pre-tensioner mechanism of the driver's seat belt, or a notification by causing the seat belt to vibrate. The information provider 134 provides an action-proposing notification to the driver, for example, from a time point at which the TTC reaches the third threshold value Th3 to a time point at which the TTC reaches the second threshold value Th2.

Here, the predetermined action means that an amount of operation on the accelerator pedal is less by a predetermined value than the amount of operation before a predetermined time or that an operation on the accelerator pedal is released. The driver tends to perform an action for avoidance after decreasing the amount of operation on the accelerator pedal or stopping the operation on the accelerator pedal when the driver does not perform an action for controlling deceleration or steering, recognizes a risky object, and avoids the risky object. This tendency has been found by analyzing various results of experiment, simulation, or the like. In this way, the information provider 134 can provide information in which the driver's intention is more reflected by determining whether the action-proposing notification is to be provided on the basis of whether the predetermined action has been performed.

In the aforementioned example, when the driver sees the risky object while the overlook notification is being performed, the overlook notification may be stopped even before the TTC has not reached the second threshold value Th2. In the example, when the driver has performed an action based on proposal or a predetermined action while the action-proposing notification is being performed, the action-proposing notification may be stopped even before the TTC reaches the second threshold value Th2.

In the example, when an event in which a risky object is present occurs while the TTC is between the third threshold value Th3 and the second threshold value Th2 (for example, when a pedestrian has popped out), the information provider 134 provides a notification along with a risky indication on the basis of the driver's action at that time. For example, the information provider 134 provides the overlook notification when the driver does not see the risky object and provides the action-proposing notification when the driver sees the risky object and performs the predetermined action.

Specific Example 1

Figure 6:
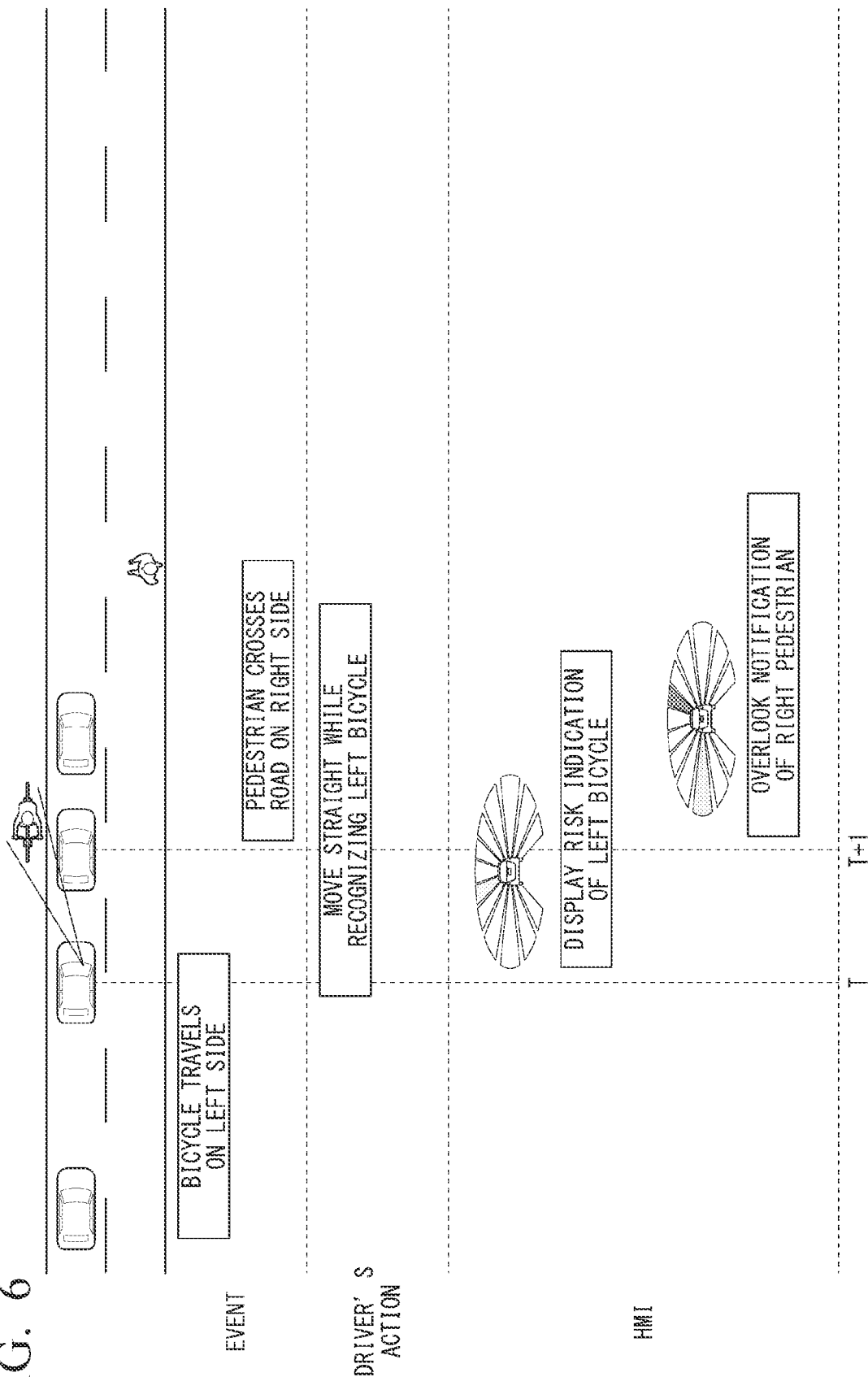
FIG. 6 is a diagram showing an example of a relationship between an event, a driver's action, and information provided by an HMI.

FIG. 6 is a diagram showing an example of a relationship between an event, a driver's action, and information provided in the HMI. It is assumed that the vehicle M travels straight on a road. At this time, it is assumed that a bicycle travels on the left side of the vehicle M. At time T, the driver of the vehicle M sees the bicycle and the driver causes the vehicle M to travel straight while recognizing the bicycle. In this case, the information provider 134 displays a risk indication indicating the direction of the bicycle with respect to the vehicle M on the display. Thereafter, at time T+1, it is assumed that a pedestrian being going to cross a road on the right side of the vehicle M appears. At this time, when the driver does not see the pedestrian, the information provider 134 displays an overlook notification for the pedestrian on the display.

As described above, the information provider 134 notifies the driver of appropriate information on the basis of the driver's degree of recognition of the surroundings. Accordingly, the driver can control the vehicle M such that the vehicle M avoids the risky object with time to spare.

Specific Example 2

Figure 7:
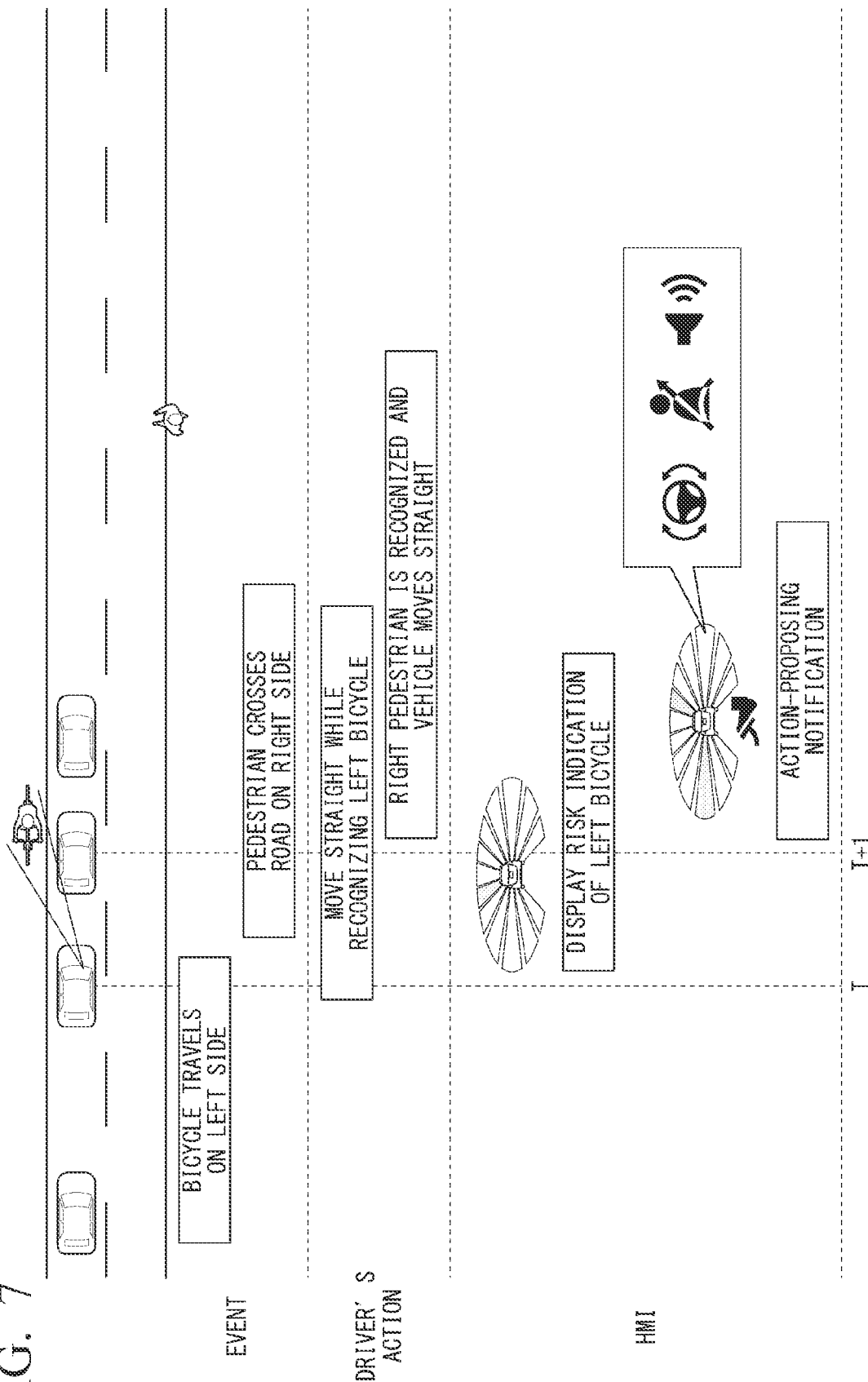
FIG. 7 is a diagram showing another example of a relationship between an event, a driver's action, and information provided by an HMI.

FIG. 7 is a diagram showing another example of a relationship between an event, a driver's action, and information provided in the HMI. Differences from those shown in FIG. 6 will be mainly described below. At time T+1, it is assumed that a pedestrian being going to cross a road on the right side of the vehicle M appears. At this time, when the driver does not see the pedestrian and does not perform a predetermined action, the information provider 134 provides an action-proposing notification.

As described above, the information provider 134 notifies the driver of appropriate information on the basis of the driver's degree of recognition of the surroundings and the driver's action. Accordingly, the driver can control the vehicle M such that the vehicle M avoids the risky object with time to spare.

Flowchart

Figure 8:
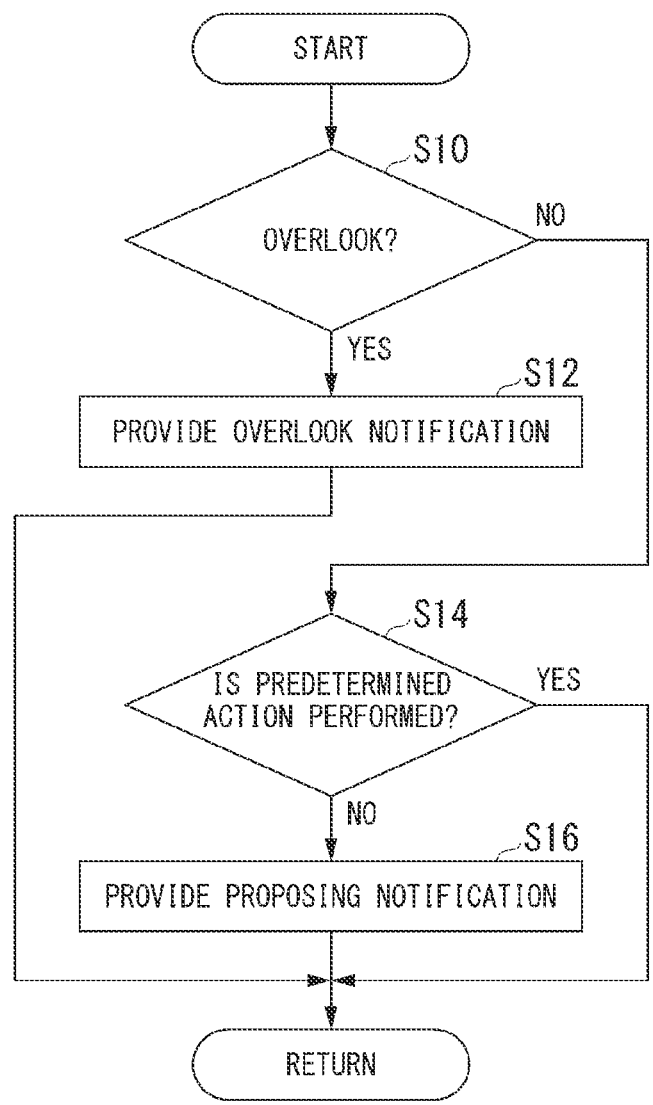
FIG. 8 is a flowchart showing an example of a routine that is performed by a notification controller.

FIG. 8 is a flowchart showing an example of a routine which is performed by the notification controller 120. In this routine, it is assumed that a risky object is present at a predetermined distance in front of the vehicle M. First, the notification controller 120 determines whether the driver overlooks the risky object (Step S10). When the driver overlooks the risky object (when the driver does not see the risky object), the notification controller 120 performs an overlook notification (Step S12).

When the driver does not overlook the risky object (when the driver sees the risky object), the notification controller 120 determines whether the driver is performing a predetermined action (Step S14). When the driver is performing a predetermined action, this routine ends. In this case, for example, a risky indication indicating a direction of a position of the risky object with respect to the vehicle M is displayed on the display.

When the driver does not perform the predetermined action, the notification controller 120 provides an action-proposing notification (Step S16). Thereafter, this routine ends.

As described above, the notification controller 120 can notify the driver of appropriate information on the basis of the driver's degree of recognition of the surroundings and the driver's action. For example, when the driver is performing the predetermined action, the notification controller 120 does not provide an action-proposing notification and thus it is possible to reduce inconvenience to the driver. Particularly, when the driver's amount of operation on the accelerator pedal decreases or the driver stops the operation on the accelerator pedal, the driver is estimated to perform an action for avoiding a risky object and thus the notification controller 120 curbs notifying the driver. As a result, the notification controller 120 can provide information in which the driver's intention is reflected.

In the example, the overlook notification or the action-proposing notification is displayed, but the overlook notification and the action-proposing notification may be simultaneously displayed. For example, information indicating that deceleration is to be performed may be notified using the overlook notification or the steering wheel may rotate or vibrate automatically such that the driver recognizes a direction in which the risky object is avoided.

One or both of the overlook notification and the action-proposing notification may be omitted. For example, the overlook notification may not be performed when the driver overlooks the risky object. The action-proposing notification may also be performed when the driver overlooks the risky object.

Braking Control

Figure 9:
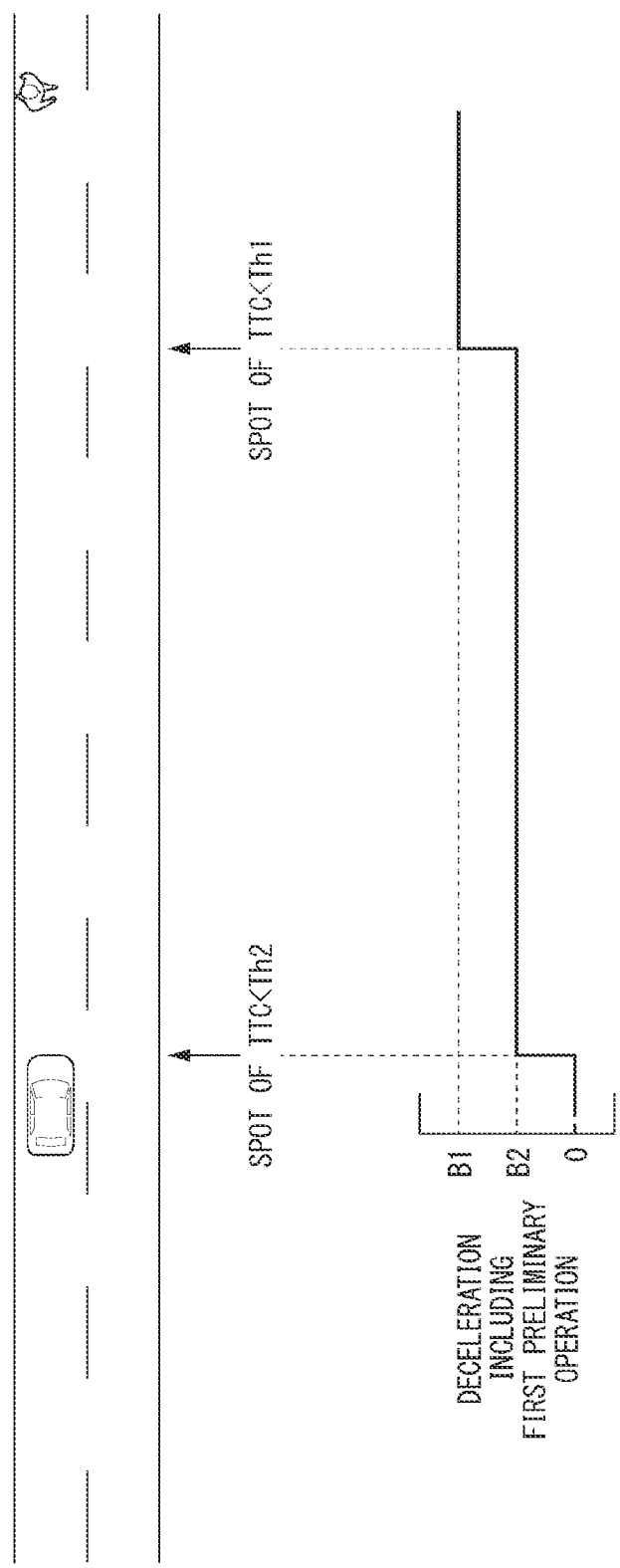
FIG. 9 is a diagram showing braking control.

Routines when the TTC is less than the second threshold value Th2 and when the TTC is less than the first threshold value Th1 will be described below with reference to FIG. 9. FIG. 9 is a diagram showing braking control.

When a degree of closeness between a risky object and the vehicle M satisfies a predetermined condition (for example, when the TTC is less than the second threshold value Th2), the first controller 140 performs a first action for notifying a driver of the vehicle M that the risky object is present. The first action is, for example, an action for instructing the brake device 210 and/or the travel driving force output device 200 to output a braking force for decelerating the vehicle M at a second deceleration B2 from a time point at which the TTC becomes less than the second threshold value Th2 to a time point at which the TTC becomes less than the first threshold value Th1. The second deceleration B2 is a deceleration less than a first deceleration B1 (close to zero). The second threshold value Th2 is greater than the first threshold value Th1. The first action is so-called CDC control. At this time, a warning (FCW) indicating that the vehicle becomes close to the risky object in front may be output. Deceleration using the braking force may be performed when the warning (FCW) has been output for a predetermined time.

The second controller 150 performs a second action when the TTC is less than the first threshold value Th1. The second action is an action for controlling the vehicle M such that the vehicle M does not collide with the risky object (a collision mitigation braking system (CMBS)). For example, the second controller 150 instructs the brake device 210 and/or the travel driving force output device 200 to output a braking force for decelerating the vehicle M at the first deceleration B1. The first deceleration B1 is, for example, a deceleration of about 0 comma number [G] (close to 1). Accordingly, the second controller 150 rapidly decelerates and stops the vehicle M to avoid collision with the risky object. Functions of calculating a brake output, a regenerative control quantity, an engine brake quantity, and the like from the instructed deceleration are provided in the ECU of the brake device 210 or the travel driving force output device 200, and the ECU determines the control quantities on the basis of the instructed deceleration and the speed of the vehicle M. This technique is known and thus detailed description thereof will be omitted.

For example, the second controller 150 may determine whether an object is present in a lateral area extending from slightly before the risky object to the rear side of the vehicle and cause the vehicle M to travel in a traveling lane beside the risky object and to avoid the risky object when no object is present in the lateral area. For example, when it is difficult to avoid the risky object using the braking force, the second controller 150 may cause the vehicle to travel in a lateral traveling lane.

In the example, when the TTC is less than the second threshold value Th2 or less than the first threshold value Th1, the CDC or the CMBS is performed, but a traffic sign detecting function (TSR), a traffic signal detecting function (TLI), a function of detecting or notifying of a vehicle approaching the vehicle M from the right or left side thereof, an automatic steering avoiding function, an emergency braking system, or the like may be started to perform various types of control instead (or in addition) thereof. For example, the traffic sign detecting function (TSR), the traffic signal detecting function (TLI), or the function of detecting or notifying of a vehicle approaching the vehicle M from the right or left side thereof may be started when the vehicle M passes through a crossing, or the automatic steering avoiding function may be started when the vehicle M approaches a pedestrian.

Notification According to Road Structure

Figure 10:
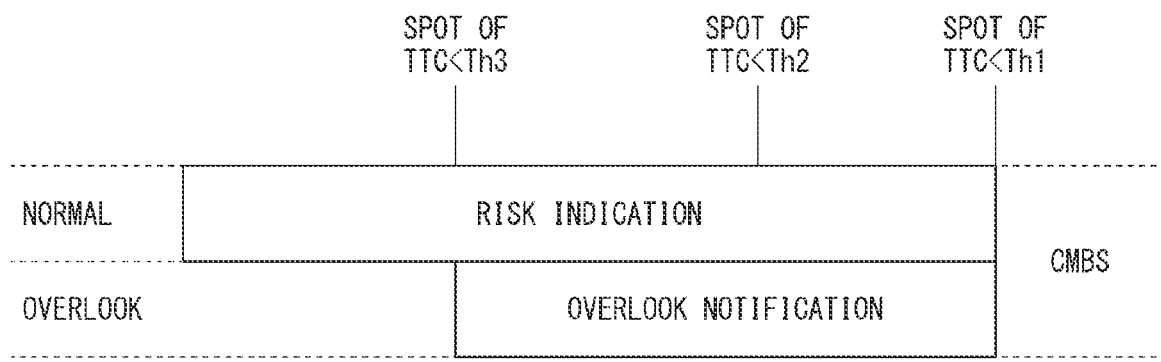
FIG. 10 is a diagram showing another example of a notification mode.

The notification controller 120 may skip causing the vehicle M to provide an action-proposing notification according to a road structure. FIG. 10 is a diagram showing another example of the notification mode. For example, when the vehicle M enters a crossing and is going to turn right or turn left and a risky object is a specific type such as a pedestrian, proposing notification may be omitted. In this case, the warning (FCW) and the CDC control may be omitted and the overlook notification may be performed until the TTC reaches the first threshold value Th1. This is because it is difficult to predict movement of a pedestrian in the crossing and an action cannot be easily proposed.

As described above, the notification controller 120 can notify of appropriate information on the basis of the driver's degree of recognition of the surroundings and the driver's action. As a result, the notification controller 120 can provide information in which the driver's intention is reflected.

The threshold values Th1 to Th3 may be changed according to the speed of the vehicle M and performance or specifications of various devices for recognizing a risky object (specifications or functions of the camera 10, the radar device 12, the LIDAR device 14, the object recognition device 16, the recognizer 110, or the like). For example, various devices may be set on the basis of a distance at which an object is recognizable.

Another Example of Process Associated with Overlook Notification

An overlook notification or an overlook re-notification may be provided as follows. The notification controller 120 performs notification when a risky object enters a surrounding area (for example, areas A and B at the time of traveling straight or areas C and D at the time of turning right or turning left which will be described later) and the driver does not see the risky object, and then performs re-notification when the risky object enters a moving area (for example, the area C at the time of traveling straight or the area A at the time of turning right or turning left which will be described later) and the driver does not see the risky object entering a re-notification area. The notification controller 120 performs notification when a risky object moving faster than the aforementioned risky object is predicted to be present (or move) in a surrounding area after a first predetermined time and the driver does not see the risky object, and then performs re-notification when the risky object is predicted to enter the moving area when the driver has seen the risky object or when a second predetermined time has elapsed after the notification has been performed and the driver does not see the risky object predicted to enter the moving area. In the following description, for example, it is assumed that the notification is stopped when the driver sees a risky object after notification has been performed.

Notification Area and Re-Notification Area on Straight Road

Figure 11:
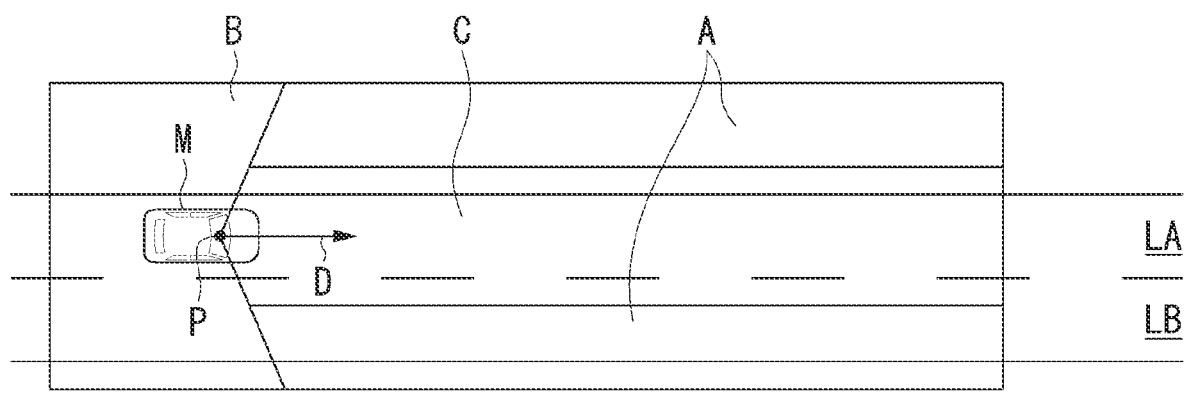
FIG. 11 is a diagram showing a notification area and a re-notification area of a straight road.

FIG. 11 is a diagram showing a notification area and a re-notification area on a straight road. It is assumed that the vehicle M travels in a direction D in a lane LA on the lane LA and a road including the lane LA. The direction D indicates the traveling direction of the vehicle M with respect to the center of gravity P of the vehicle M.

An area C is an area including the lane LA in which the vehicle M travels and is an area formed by straight lines extending a first predetermined distance in the traveling direction from the center of gravity P with a predetermined angle on the right and left sides about the direction D, straight lines extending a second predetermined distance in parallel to the direction D from the tips of the straight lines, and a straight line connecting the tips of the two straight lines extending the second predetermined distance in parallel to the direction D. The length in the traveling direction of the area C is a distance by which the vehicle M travels for a predetermined time. The predetermined time is in a range of from 4 seconds to 5 seconds and is, for example, 4.5 seconds. Here, the length is equal to or greater than a set minimum distance and less than a set maximum distance. The area C is a re-notification area.

An area A is an area including the area C and is an area formed by straight lines extending a third predetermined distance in the traveling direction from the center of gravity P with a predetermined angle on the right and left sides about the direction D, straight lines extending a fourth predetermined distance in parallel to the traveling direction D from the tips of the straight lines, and a straight line connecting the tips of the two straight lines extending the fourth predetermined distance in parallel to the traveling direction D.

An area B is an area adjacent to the area A and the area C. The area B is an area formed by straight lines extending a predetermined distance in the traveling direction from the center of gravity P with a predetermined angle on the right and left sides about the direction D, straight lines extending a fifth predetermined distance in antiparallel to the direction D from the tips of the straight lines, and a straight line connecting the tips of the two straight lines extending the fifth predetermined distance in parallel to the traveling direction D. The areas A, B, and C are notification areas.

Notification Area and Re-Notification Area at Crossing

Figure 12:
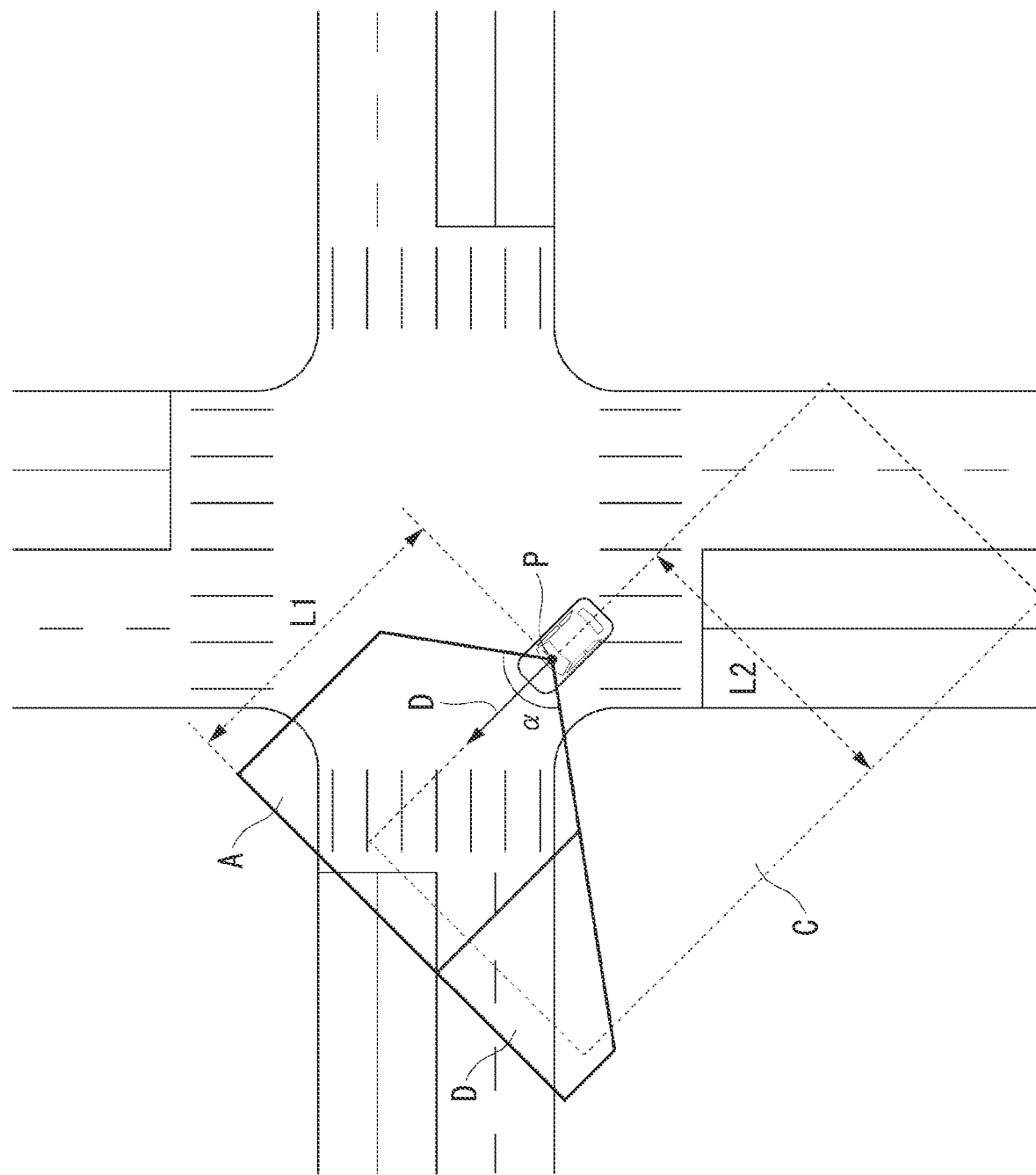
FIG. 12 is a diagram showing a notification area and a re-notification area of a crossing.

FIG. 12 is a diagram showing a notification area and a re-notification area at a crossing. It is assumed that the vehicle M is going to turn left at a crossing.

An area A is an area formed by straight lines extending a sixth predetermined distance in the traveling direction from the center of gravity P with a predetermined angle (a) on the right and left sides about the direction D, straight lines extending a seventh predetermined distance in parallel to the traveling direction D from the tips of the straight lines, and a straight line connecting the tips of the two straight lines extending the seventh predetermined distance in parallel to the direction D. A length L1 in the traveling direction of the area A is a distance by which the vehicle M travels for a predetermined time. The predetermined time is in a range of from 4 seconds to 5 seconds and is, for example, 4.5 seconds. Here, the length is equal to or greater than a set minimum distance and less than a set maximum distance. The area A is a re-notification area.

An area D is an area adjacent to the area A. The area D is formed by a straight line extending an eighth predetermined distance in the traveling direction from the center of gravity P with a predetermined angle on the left side about the direction D, a straight line extending a ninth predetermined distance in parallel to the direction D from the tip of the straight line, and a straight line connecting the tip of the straight line and the tip of the straight line extending the seventh predetermined distance in the area A, and the straight line extending the seventh predetermined distance.

An area C is a rectangular area which is set, for example, on the left side of the vehicle M. The area C is an area including a space on the left-front and left-rear sides of the vehicle. A length L2 in the lateral direction of the area C is, for example, in a range of from 15 m to 20 m. The areas A, D, and D are notification areas.

Figure 13:
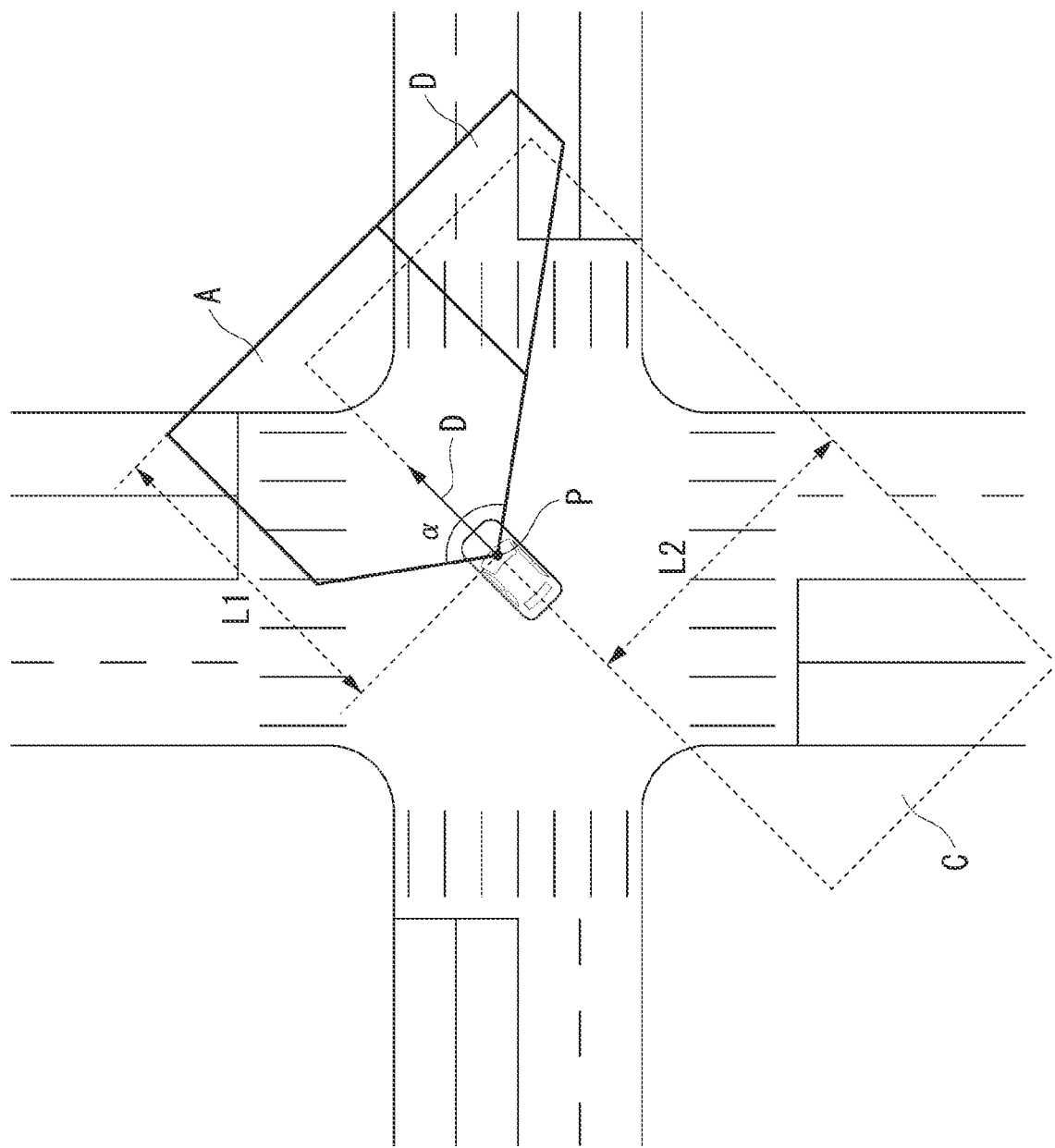
FIG. 13 is a diagram showing a notification area and a re-notification area of a crossing.

FIG. 13 is a diagram showing a notification area and a re-notification area at a crossing. It is assumed that the vehicle M is going to turn right at a crossing. The notification area includes areas A, C, and D. The areas A, C, and D when the vehicle M is going to turn right are inversion of the areas A, C, and D when the vehicle M is going to turn left and thus detailed description thereof will be omitted.

In the aforementioned example, the driving support device 100 sets areas preset with respect to the vehicle M as the notification area and the re-notification area, but may set the notification area or the re-notification area on the basis of edges or lane markings of a road, road markings, structures, and the like instead thereof (in addition thereto).

Outline of Routine Associated with Notification

A process of performing notification when a risky object is present in the notification area or the re-notification area and a notification (or warning) process associated with a look-sideways determining process will be described below.

Figure 14:
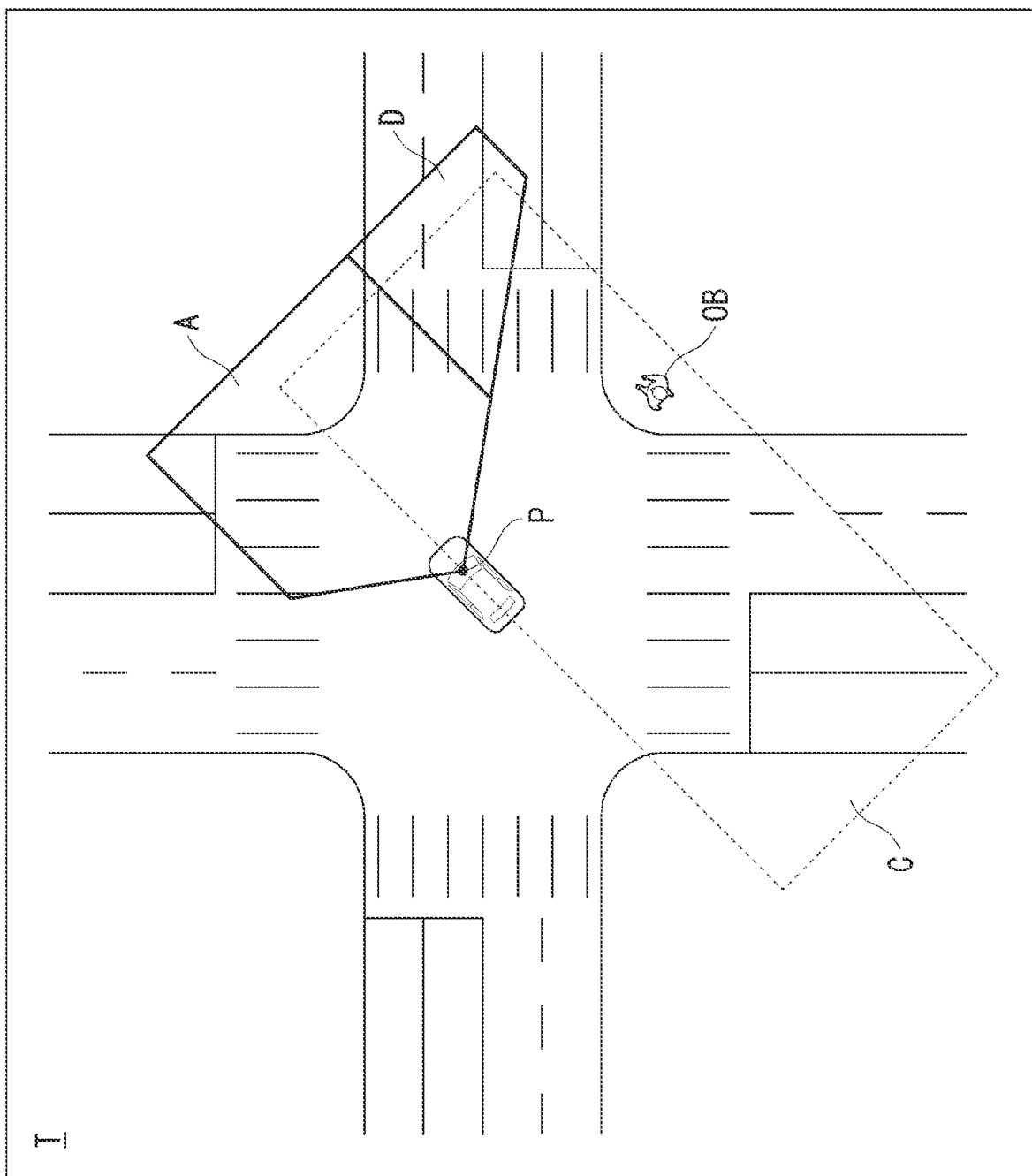
FIG. 14 is a diagram showing an example of a situation in which notification is performed.
Figure 15:
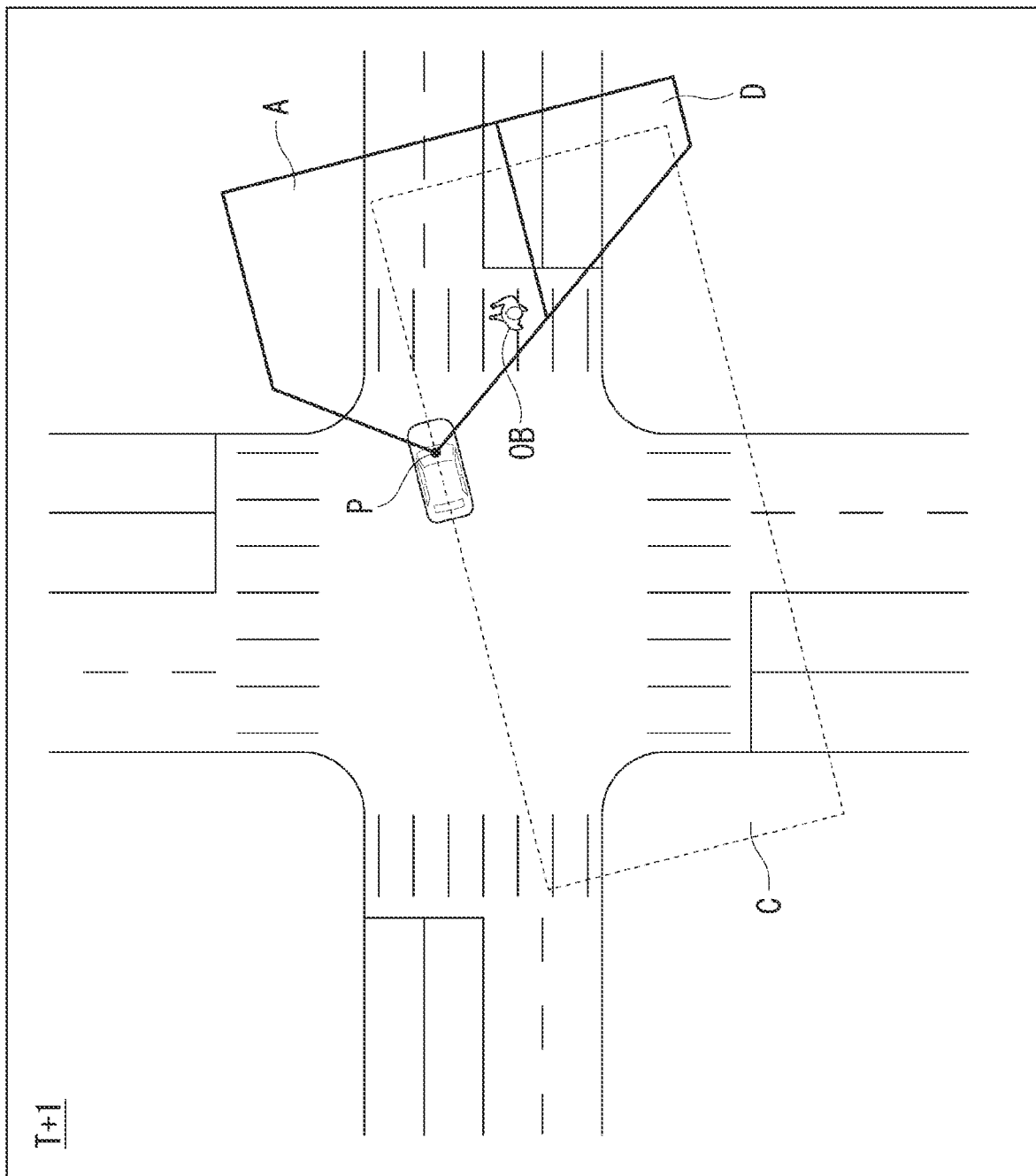
FIG. 15 is a diagram showing an example of a situation in which re-notification is performed.

For example, notification is performed when a risky object OB is present in the area C and the driver does not see the risky object at time T as shown in FIG. 14, and the notification is stopped when the driver sees the risky object after the notification has been performed. Thereafter, when the risky object is present in the area A at time T+1 as shown in FIG. 15, re-notification is performed. In this way, when a risky object seen by the driver due to the notification is present in the re-notification area (the area A), re-notification is performed and thus it is possible to more appropriately notify the driver of a nearby object.

Figure 16:
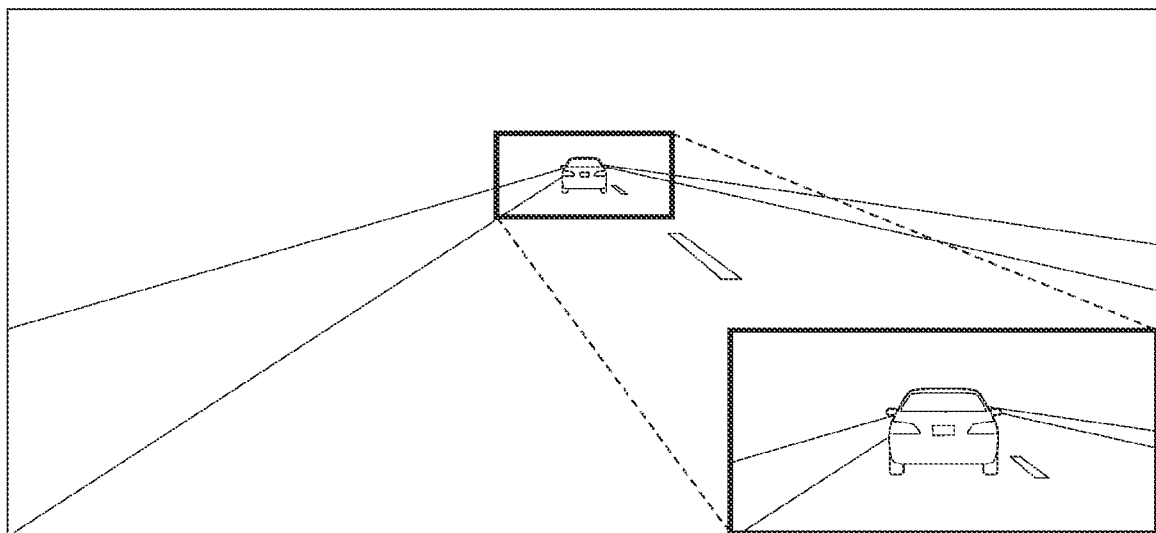
FIG. 16 is a diagram showing an example of a situation in which warning is issued.

When a first condition is satisfied, the notification controller 120 causes the HMI 30 to output a first warning. The first condition is a condition that the driver's sightline is out of a predetermined range in which the driver is considered to see a view in front of a mobile object M (for example, out of a range corresponding to the front windshield) and a state in which the sightline is out of the range is maintained for a first time (for example, 3 seconds). When a second condition is satisfied, the notification controller 120 causes the HMI 30 to output a second warning. The second condition is a condition that the driver's sightline is out of the range, a risky object to be noticed is present in a reference area (a re-notification area) set with respect to the mobile object M as shown in FIG. 16, and the state in which the sightline is out of the range is maintained for a second time (for example, 1 second) shorter than the first time.

The first condition may be a condition that the driver's face direction is out of a predetermined range in which the driver is considered to see a view in front of the mobile object M and a state in which the face direction is out of the range is maintained for the first time. The second condition may be a condition that the driver's face direction is out of the range, a risky object to be noticed is present in a reference area set with respect to the mobile object M, and the state in which the face direction is out of the range is maintained for the second time shorter than the first time.

Figure 17:
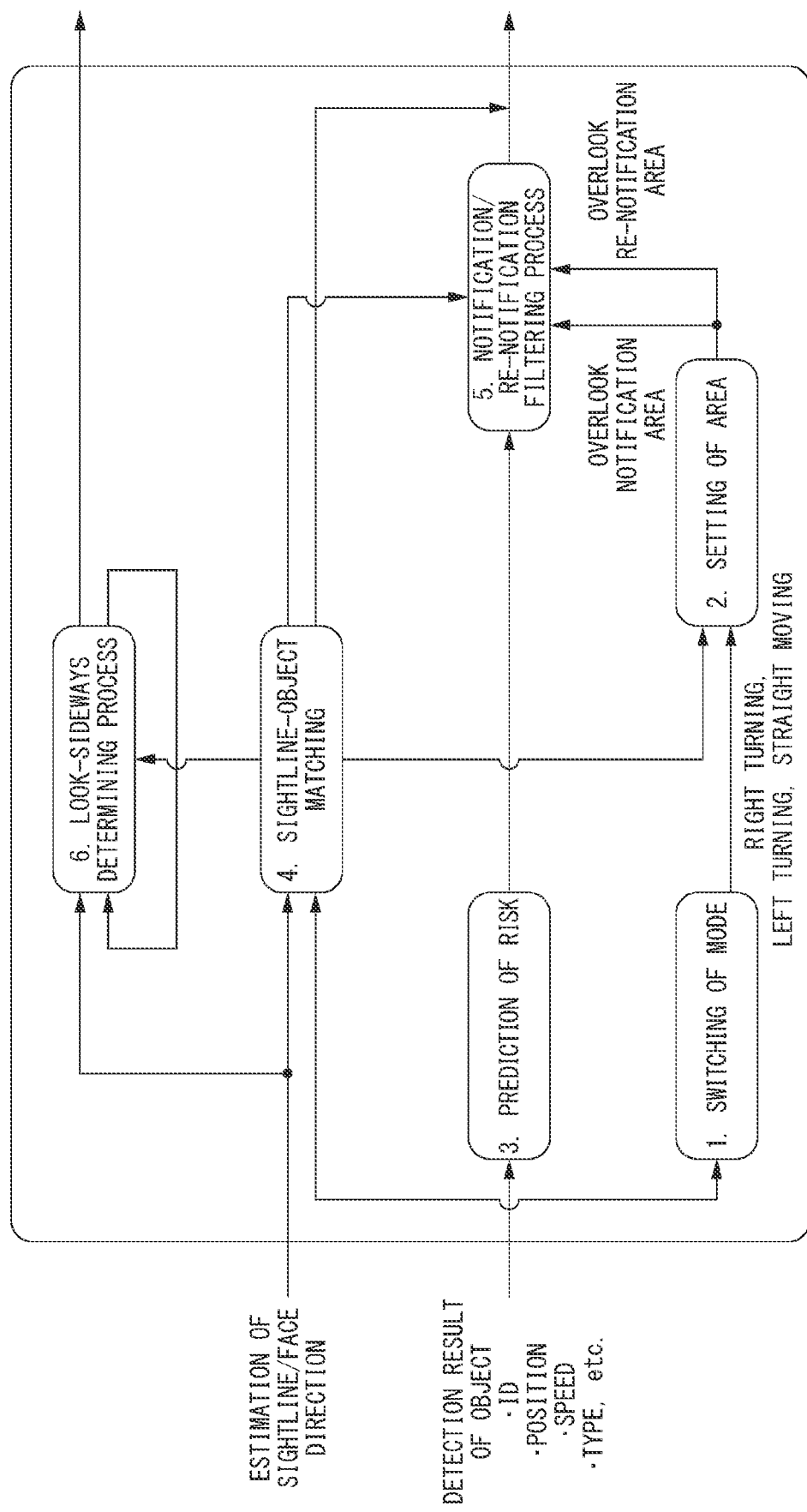
FIG. 17 is a diagram schematically showing a process associated with notification.

FIG. 17 is a diagram schematically showing a routine associated with notification.

1. Switching Mode

The notification controller 120 sets a right turning mode, a left turning mode, or a straight moving mode on the basis of a direction indicator of the vehicle M and the driver's operating angle of the steering wheel. For example, the straight moving mode is set when the direction indicator does not flick, and the left turning mode is set when the direction indicator flicks such that the vehicle M move leftward. The right turning mode is set when the steering wheel is operated rightward and the operating angle is equal to or greater than a threshold value, the left turning mode is set when the steering wheel is operated leftward and the operating angle is equal to or greater than the threshold value, and the straight moving mode is set otherwise. When a flicking state of the direction indicator and an operating state of the steering wheel do not match, the mode is determined with higher priority given to the operation of the steering wheel.

2. Setting of Area

The notification controller 120 sets areas based on the mode determined in (1. Switching of mode). Accordingly, a notification area and a re-notification area are set.

3. Prediction of Risk

The notification controller 120 acquires a current position and a predicted position of an object on the basis of results of detection of the object (an ID, a position, a speed, and a type of the object). Examples of the type of an object include a vehicle with four wheels, a vehicle with two wheels, a bicycle, and a pedestrian.

4. Matching Between Sightline and Object

The notification controller 120 determines whether the driver's sight line matches a direction in which an object is present.

5. Notification/Re-Notification Filtering Process

The notification controller 120 performs a notification/re-notification filtering process on the basis of the result of matching between a sightline and an object for determining whether the sightline is directed to a risky object. The notification controller 120 selects a risky object of which an overlook notification or an overlook re-notification is provided.

6. Look-Sideways Determining Process

The notification controller 120 determines whether the driver is looking off on the basis of the driver's sightline or face direction.

"Details of (2. Setting of Area)"

Figure 18:
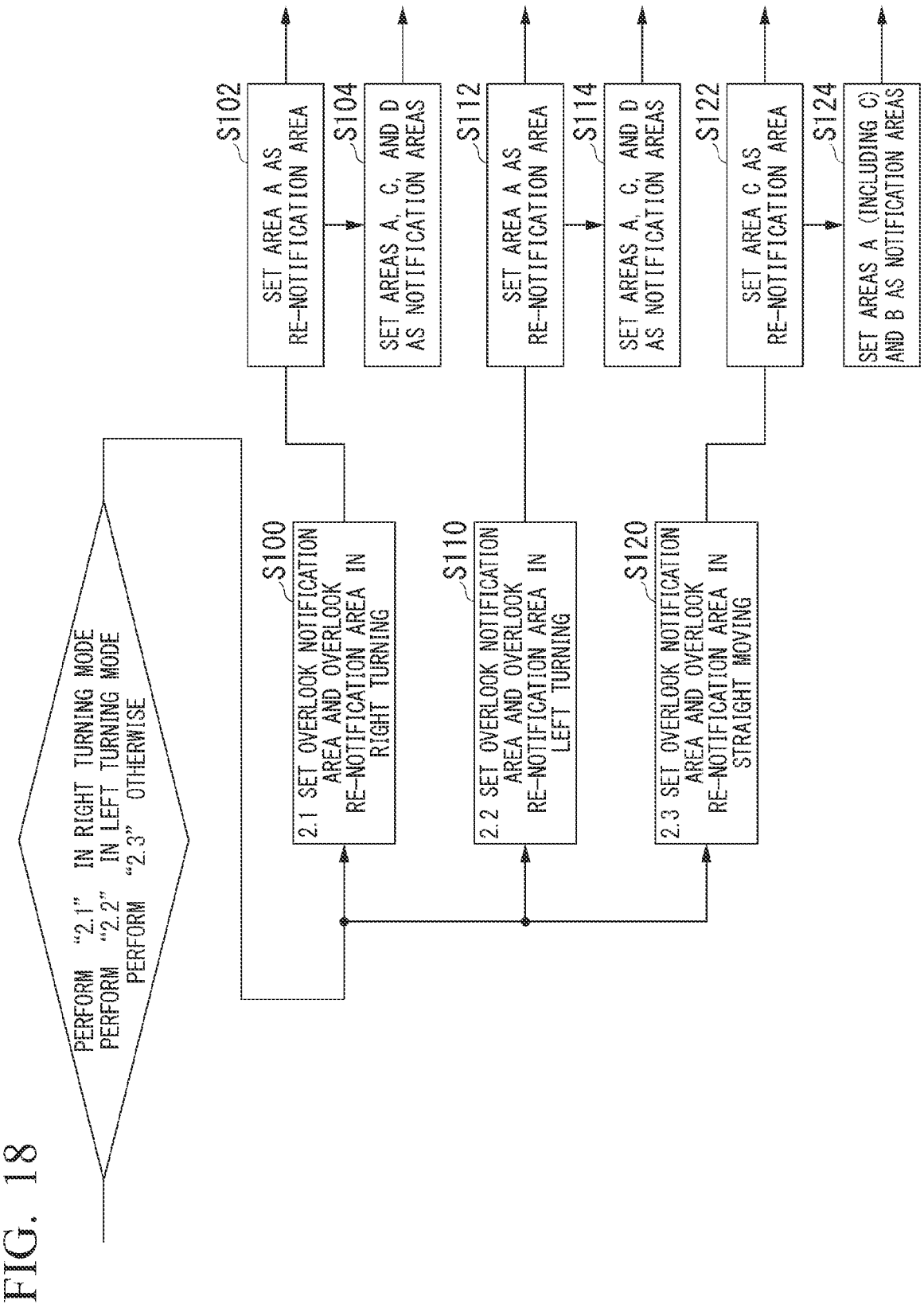
FIG. 18 is a diagram showing an area setting process.

FIG. 18 is a diagram showing an area setting process. The notification controller 120 sets a notification area and a re-notification area at the time of turning right when the right turning mode is set in the (1. Switching of mode) (Step S100). The notification controller 120 sets the area A as the re-notification area (Step S102) and sets the areas A, C, and D as the notification area (Step S104).

The notification controller 120 sets a notification area and a re-notification area at the time of turning left when the left turning mode is set in the (1. Switching of mode) (Step S110). The notification controller 120 sets the area A as the re-notification area (Step S112) and sets the areas A, C, and D as the notification area (Step S114).

The notification controller 120 sets a notification area and a re-notification area at the time of moving straight when the right turning mode and the left turning mode are not set in the (1. Switching of mode) (in the other case) (Step S120). The notification controller 120 sets the area C as the re-notification area (Step S122) and sets the areas A, B, and C as the notification area (Step S124).

"Details of 3. Prediction of Risk"

Figure 19:
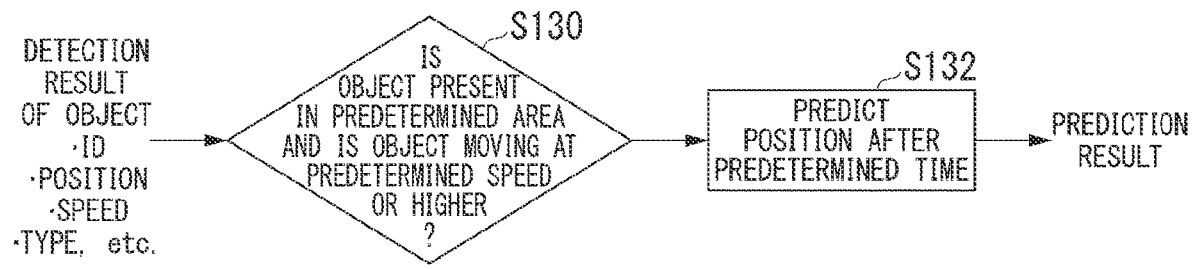
FIG. 19 is a diagram showing a risk predicting process.

FIG. 19 is a diagram showing a risk predicting process. The notification controller 120 determines whether an object is present in a predetermined area and is moving at a predetermined speed or higher on the basis of results of detection of the object (Step S130). The predetermined area is an area including a notification area and a re-notification area and an area larger than the notification area and the re-notification area. The predetermined area is an area which is set in advance with respect to the vehicle M. The predetermined area may vary depending of the mode of the vehicle M.

Figure 20:
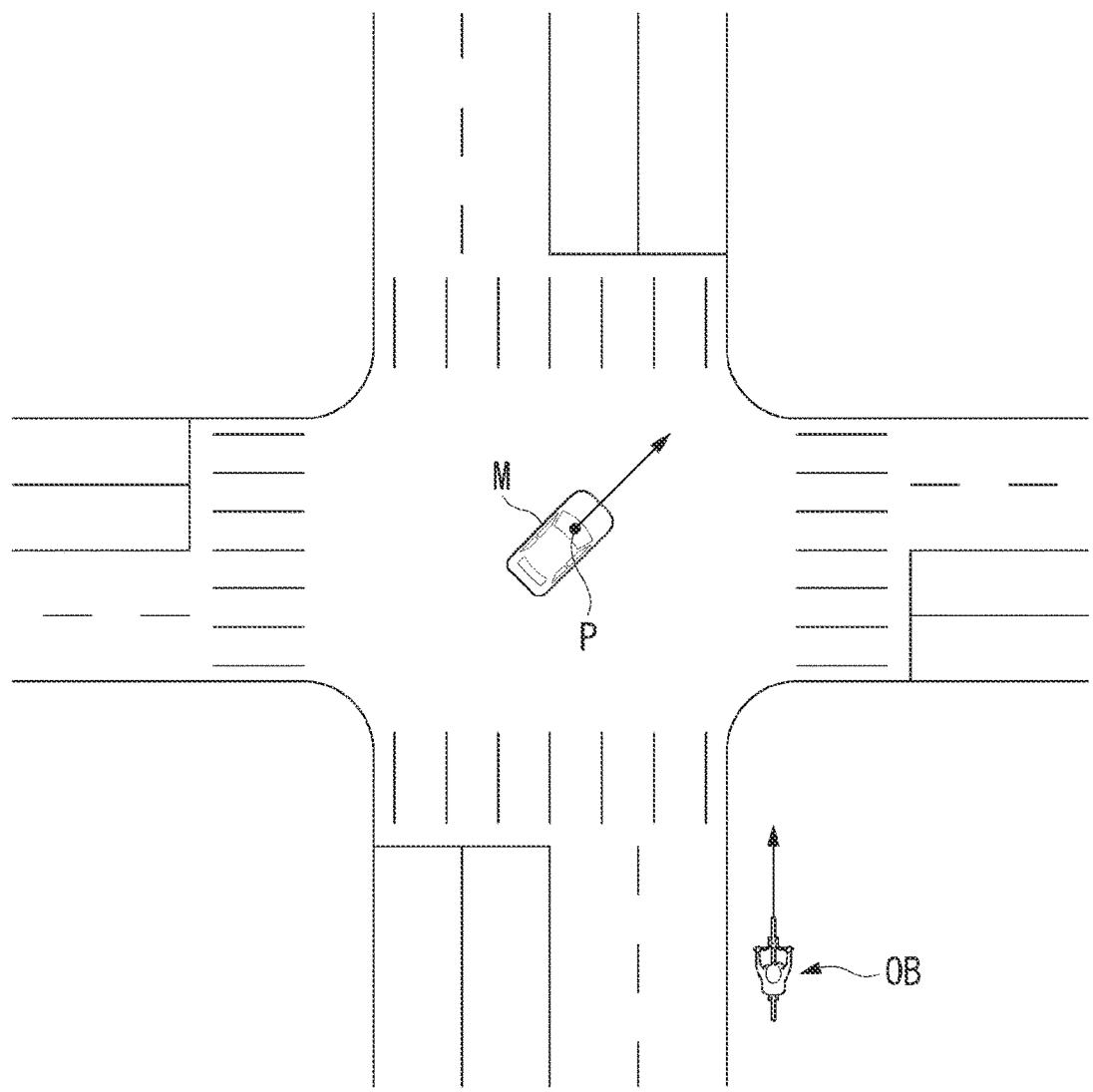
FIG. 20 is a diagram showing a fast object.

When an object is present in the predetermined area and is moving at the predetermined speed or higher, the notification controller 120 predicts a position of the object after a predetermined time elapses (Step S132). For example, the notification controller 120 predicts the position of the object (a fast object) at a plurality of time points in the future on the basis of the speed of the object. Accordingly, as shown in FIG. 20, an object approaching the vehicle M from a location far from the vehicle M is recognized.

"Details of 5. Notification/Re-Notification Filtering Process"

Figure 21:
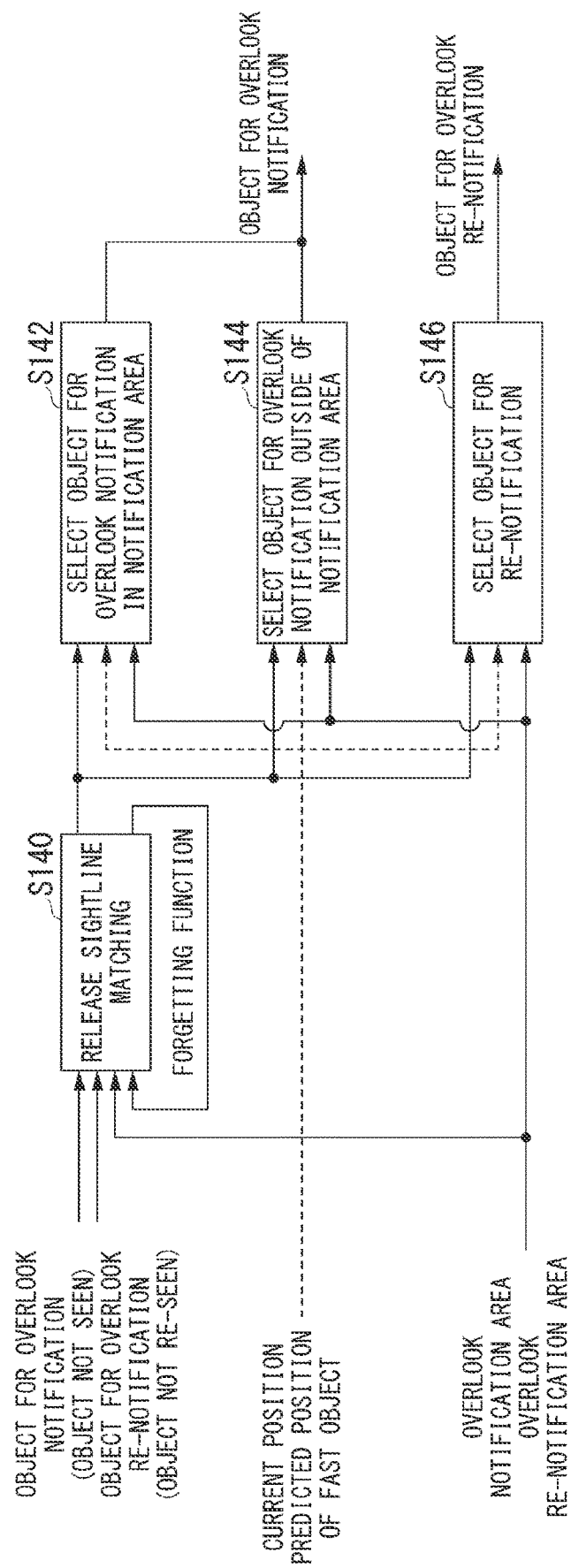
FIG. 21 is a diagram showing a notification and re-notification filtering process.

FIG. 21 is a diagram showing the notification/re-notification filtering process. The notification controller 120 acquires an object of which an overlook notification is to be provided (an object which is not seen by the driver) and an object of which an overlook re-notification is to be provided (an object which is not re-seen by the driver) with reference to a position of an object, information indicating whether an object is seen by the driver, a notification area, and a re-notification area (Step S140). The object which is not re-seen is an object that enters the re-notification area after the overlook notification has been provided and is not seen by the driver. The notification controller 120 has a forgetting function. For example, the forgetting function is a function of forgetting information correlated with a risky object entering the notification area (for example, information indicating that overlook notification has been performed or information indicating that overlook re-notification has been performed) when a predetermined time has elapsed after the risky object has exited the notification area. The same routine is performed when an object entering the re-notification area exits.

The notification controller 120 selects an object of which an overlook notification is to be provided in the notification area with reference to the information acquired in Step S140 and information indicating a current position and a predicted position of an object in the notification area (Step S142). For example, when an object present in the notification area or a predicted position of the object present in the notification area is present in the notification area for a predetermined time or longer, the object is selected as a notification target. Accordingly, an object which is present in the notification area and which is not seen is selected.

The notification controller 120 selects an object of which the overlook notification is to be provided outside of the notification area with reference to the information acquired in Step S140 and the information indicating a current position and a predicted position of an object (Step S144). Accordingly, an object which is currently present outside of the notification area, is predicted to enter the notification area in the near future, and is not seen (for example, a fast object) is selected.

The notification controller 120 selects an object which is present in the re-notification area and an object which is predicted to enter the re-notification area with reference to the information acquired in Step S140 and the information indicating a current position and a predicted position of an object (Step S146). Accordingly, an object which is currently present in the re-notification area or is predicted to be present close to the re-notification area in the near future and is not seen is selected.

As described above, an object of which the overlook notification is to be provided and an object of which overlook re-notification is to be provided are selected.

"Details of Process of Selecting Object for Overlook Notification Outside of Notification Area (S144)"

Figure 22:
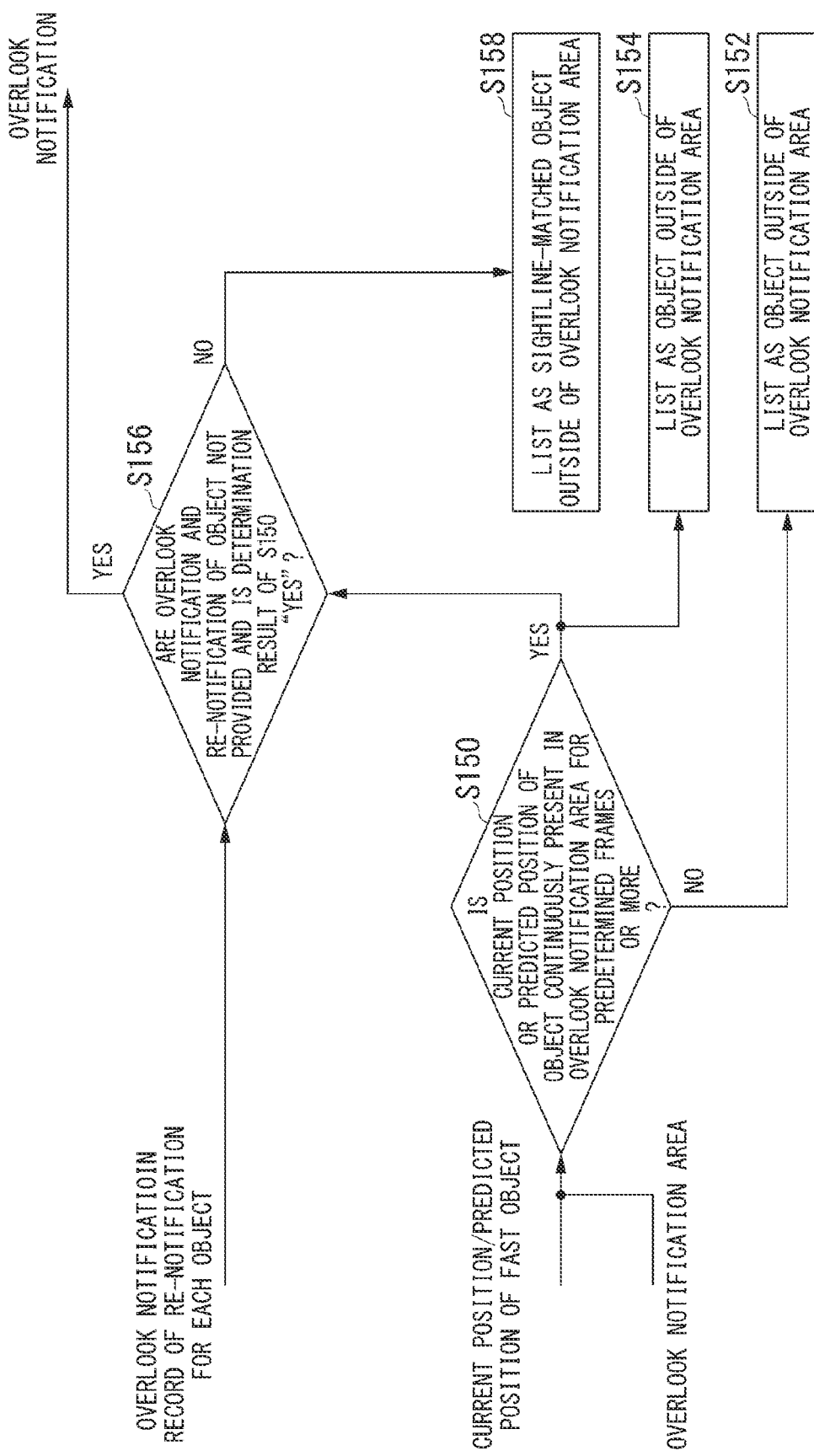
FIG. 22 is a diagram showing a process of selecting an object of overlook notification outside of a notification area.

FIG. 22 is a diagram showing the process (S144) of selecting an object of which an overlook notification is to be provided outside of the notification area. The notification controller 120 acquires information of a current position and a predicted position of a fast object and information of the notification area and determines whether the current position or the predicted position of the target object is continuously present in the notification area for predetermined frames or more (a predetermined time or longer) (Step S150).

When the current position or the predicted position of the target object is not continuously present in the notification area for the predetermined frames or more, the notification controller 120 stores the object along with the determination result as an object outside of the notification area in a list in the storage device (Step S152).

When the current position or the predicted position of the target object is continuously present in the notification area for the predetermined frames or more, the notification controller 120 stores the object along with the determination result as an object in the notification area in a list in the storage device (Step S154).

The notification controller 120 determines whether the overlook notification and the overlook re-notification of the object are not performed and the determination result of Step S150 is "YES" with reference to the overlook notification and the overlook re-notification stored for each object and the determination result of Step S150 (Step S156). When this condition is satisfied, the notification controller 120 performs overlook notification of the object. When this condition is not satisfied, the notification controller 120 stores the object along with the determination result as an object outside of the notification area in a list in the storage device (Step S158). For example, this object is stored in a list as an object seen by the driver.

Even when a fast object outside of the notification area is predicted to enter the notification area as described above, an appropriate notification is provided to the driver.

"Details of Process of Selecting Object for Re-Notification (S146)"

FIG. 23 is a diagram showing the process (S146) of selecting an object for re-notification. The notification controller 120 acquires information of each object of which the overlook notification has been provided (information of an object which is present in the notification area and of which the overlook notification has been provided), information of the current position thereof, and information indicating whether the driver has seen the object and determines whether the object of which the overlook notification has been provided is seen again (matched with the sightline) after the driver has seen the object with reference to the information (Step S160).

When the driver does not see the object again, the notification controller 120 determines whether an overlook re-notification of the object has been provided with reference to history information of the overlook re-notification of each object (Step S162). When the overlook re-notification has not been provided, the notification controller 120 determines whether the current position of the object is continuously present in the re-notification area for predetermined frames or more with reference to the information of the re-notification area (Step S164).

When the current position of the object is continuously present in the re-notification area for predetermined frames or more, the notification controller 120 provides an overlook re-notification of the object (Step S164). When the current position of the object is not continuously present in the re-notification area for predetermined frames or more, the notification controller 120 stores the object as an object, which is seen after the overlook notification, of which the overlook re-notification has not been provided, and which is not present in the re-notification area, in a list in the storage device.

In the aforementioned example, when an overlook notification of an object has not been provided and the object is present in the re-notification area, an overlook notification thereof is provided. In the aforementioned example, for example, an overlook re-notification of an object which is continuously present in the re-notification area after a notification thereof has been provided because the object is present in the re-notification area in the notification area may not be provided or the overlook re-notification may be provided. In the aforementioned example, when a risky object in the notification area is continuously present in the notification area for a predetermined time after the overlook notification of the risky object in the notification area has been provided and thus the driver has seen the risky object, the notification thereof may not be performed or the notification may be performed again when a preset time has elapsed.

For example, when an object is present outside of the re-notification area for a predetermined time after the overlook re-notification thereof has been provided, information indicating that the overlook re-notification of the object has been provided is forgotten. In this case, when the object re-enters the re-notification area, the overlook re-notification of the object is to be provided. For example, when an object is present outside of the notification area for a predetermined time after the overlook notification thereof has been provided, information indicating that the overlook notification of the object has been provided is forgotten. In this case, when the object re-enters the notification area, the overlook notification of the object is to be provided.

"Details of 6. Look-Sideways Determining Process"

FIG. 24 is a diagram showing the look-sideways determining process. The notification controller 120 determines whether a sightline has been detected on the basis of an image in which the driver appears (Step S170). When it is determined in Step S170 that the sightline has been detected, determination using the sightline direction or determination using the sightline direction and the face direction is performed. When it is determined in Step S170 that the sightline has not been detected, determination using the face direction is performed.

The notification controller 120 determines whether the face is directed to the front on the basis of the image (Step S172). For example, the notification controller 120 determines whether a yaw angle and a pitch angle of the face direction (the reference direction) are in the corresponding angle ranges thereof.

When it is determined that the face is directed to the front, the notification controller 120 sets up a flag indicating that the face is directed to the front (Step S174). When it is determined that the face is not directed to the front, the notification controller 120 determines whether a predetermined has elapsed after the determination has been performed (Step S176). The predetermined time is, for example, 3 seconds.

The notification controller 120 determines whether the sightline is directed to the front on the basis of the image (Step S178). For example, the notification controller 120 determines whether a yaw angle and a pitch angle of the sightline direction (the reference direction) are in the corresponding angle ranges thereof.

When it is determined that the sightline is directed to the front, the notification controller 120 sets up a flag indicating that the sightline is directed to the front (Step S180). When it is determined that the sightline is not directed to the front, the notification controller 120 determines whether a predetermined has elapsed after the determination has been performed (Step S182). The predetermined time is, for example, 3 seconds.

The notification controller 120 determines whether an object is present in a predetermined area and whether a condition (1) or (2) is satisfied with reference to the detection result of an object and the mode (Step S184). The predetermined area is an area which should be recognized by the driver as an area corresponding to each of the right turning mode, the left turning mode, and the straight moving mode. The predetermined area may be, for example, the same as the re-notification area or may be an area including the re-notification area. The condition (1) is a condition that the determination result of Step S176 is negative, and the condition (2) is a condition that the determination result of S182 is negative.

When the determination result of Step S184 is positive, the notification controller 120 determines whether this state has been maintained for a predetermined time (Step S186). When the determination result of Step S184 is positive, the notification controller 120 sets up a flag indicating that an object is present in the predetermined area. The predetermined time in Step S186 is a time (for example, 1 second) shorter than the predetermined time in Step S176 or S182.

When the determination result of Step S186 is positive, when the determination result of Step S176 is positive, or when the determination result of Step S182 is positive, the notification controller 120 determines whether a reset flag is set up and a look-sideways flag is set up (Step S190). When the reset flag is set up and the look-sideways is not set up, the notification controller 120 determines whether the look-sideways flags is set up and the look-sideways has not been set up in the previous step (Step S192). When this condition is satisfied, the notification controller 120 sets up the look-sideways flag. When the look-sideways flag is set up, a look-sideways notification is provided.

When this condition is not satisfied, the notification controller 120 sets up the reset flag when a predetermined time has elapsed after the look-sideways flag has been set up (Step S194). Accordingly, when the condition that the look-sideways notification is provided is satisfied again (the driver does not see the object) after the look-sideways notification has been provided, notification is curbed until a predetermined time (for example, 3 seconds) elapses after the look-sideways notification has been provided. The predetermined time has only to be equal to or greater than the predetermined time in Step S186.

For example, after a look-sideways notification has been provided, the driver may see the surroundings of the vehicle M which are different from the direction of the position at which the object is present and be going to recognize a space for avoiding the object. Accordingly, since the look-sideways notification is curbed as described above, it is possible to curb troubling of the driver.

As described above, the notification controller 120 can issue an appropriate notification or warning for the driver's look-sideways.

According to the aforementioned embodiment, the notification controller 120 can more appropriately notify of a nearby object on the basis of a current position or a predicted position of the object, a notification area, and a re-notification area. The notification controller 120 can more appropriately issue a warning on the basis of the driver's sightline or face direction and a position of a risky object.

The aforementioned embodiment can be described as follows.

A control device including:
  a storage medium storing computer-readable instructions; and
  at least one processor connected to the storage medium,
  wherein the at least one processor executes the computer-readable instructions to perform:
    setting a moving area including a trajectory along which a mobile object is scheduled to move with behavior of the mobile object and a surrounding area near the mobile object when the mobile object moves straight, turns right, or turns left;
    controlling an information provision device configured to provide a driver of the mobile object with information such that the driver is notified of presence of a first type of object when a first type of object is present in the surrounding area and the driver does not see the first type of object; and
    controlling the information provision device such that the driver is re-notified of the first type of object when the first type of object is present in the moving area and the driver does not see the first type of object after the driver has seen the first type of object through the notification.

The aforementioned embodiment can also be described as follows.

A control device including:
  a storage medium storing computer-readable instructions; and
  at least one processor connected to the storage medium,
  wherein the at least one processor executes the computer-readable instructions to perform:
    detecting a sight line of a driver of a mobile object;
    causing an information output device, which is configured to output a warning to a driver, to output a first warning when a first condition is satisfied; and
    causing the information output device to output a second warning when a second condition is satisfied, wherein the first condition is a condition that the driver's sight line is out of a predetermined range in which the driver is considered to see a view in front of the mobile object and a state in which the sightline is out of the range is maintained for a first time, and wherein the second condition is a condition that the driver's sightline is out of the range, a risky object to be noticed is present in a reference area set with respect to the mobile object, and the state in which the sightline is out of the range is maintained for a second time shorter than the first time.

While exemplary embodiments of the present invention have been described above, the present invention is not limited to the embodiments and can be subjected various modifications and substitutions without departing from the gist of the present invention.

What is claimed is:

1. A notification control device comprising:
   a storage medium storing computer-readable instructions; and
   at least one processor connected to the storage medium, wherein the at least one non-transitory processor executes the computer-readable instructions to perform:
      setting a moving area including a trajectory along which a mobile object is scheduled to move with behavior of the mobile object and a surrounding area near the mobile object when the mobile object moves straight, turns right, or turns left;
      controlling an information provision device configured to provide a driver of the mobile object with information such that the driver is notified of the presence of a first type of object when a first type of object is present in the surrounding area and the driver does not see the first type of object; and
      controlling the information provision device such that the driver is re-notified of the first type of object when the first type of object is present in the moving area and the driver does not see the first type of object after the driver has seen the first type of object through the notification.

2. The notification control device according to claim 1, wherein the at least one non-transitory processor executes the computer-readable instructions to perform:
   controlling the information provision device such that the driver is notified of presence of a second type of object moving faster than the first type of object when the second type of object is predicted to be present in the surrounding area from another area after a first predetermined time elapses and the driver does not see the second type of object; and
   controlling the information provision device such that the driver is re-notified of the second type of object when the second type of object is predicted to be present in the moving area and the driver does not see the second type of object in a second predetermined time from a time point at which the notification has been performed or the second type of object has been seen after the driver has seen the second type of object through the notification.

3. The notification control device according to claim 1, wherein the at least one non-transitory processor executes the computer-readable instructions to perform:
   stopping the notification when the driver sees the first type of object after the notification and continuously performing the notification when the driver does not see the first type of object after the notification.

4. The notification control device according to claim 1, wherein the at least one non-transitory processor executes the computer-readable instructions to perform:
   setting an area including a lane in which the mobile object moves as the moving area when the mobile object moves straight; and
   setting a length of the moving area on the basis of a speed of the mobile object, and
   wherein the surrounding area includes a lane or a walkway adjacent to the lane.

5. The notification control device according to claim 4, wherein the at least one non-transitory processor executes the computer-readable instructions to perform:
   setting a moving area, which has a larger width than the moving area when the mobile object moves straight, with respect to the mobile object when the mobile object turns right;
   setting a length of the moving area on the basis of the speed of the mobile object; and
   setting the surrounding area on the right side of the moving area, on the right side of the mobile object, and on the right-rear side of the mobile object with respect to a traveling direction of the mobile object.

6. The notification control device according to claim 4, wherein the at least one non-transitory processor executes the computer-readable instructions to perform:
   setting a moving area, which has a larger width than the moving area when the mobile object moves straight, with respect to the mobile object when the mobile object turns left;
   setting a length of the moving area on the basis of the speed of the mobile object; and
   setting the surrounding area on the left side of the moving area, on the left side of the mobile object, and on the left-rear side of the mobile object with respect to a traveling direction of the mobile object.

7. The notification control device according to claim 3, wherein the at least one non-transitory processor executes the computer-readable instructions to perform:
   recognizing an object and tracking the recognized object;
   adding identification information to the recognized first type of object, adding notification information indicating that notification has been performed to the identification information of the first type of object when the driver is notified of presence of the first type of object, and generating correlation information in which the identification information of the first type of object and the notification information are correlated; and
   controlling the information provision device such that the driver is re-notified of the first type of object when the first type of object is present in the moving area, the driver does not see the first type of object, and the notification information has been added to the first type of object in the correlation information after the driver has seen the first type of object through the notification.

8. The notification control device according to claim 3, wherein the at least one non-transitory processor executes the computer-readable instructions to perform:
   recognizing an object and tracking the recognized object;
   adding identification information to the recognized second type of object moving faster than the first type of object, adding notification information indicating that notification has been performed to the identification information of the second type of object when the driver is notified of presence of the second type of object, and generating correlation information in which the identification information of the second type of object and the notification information are correlated; and controlling the information provision device such that the driver is re-notified of the second type of object when the second type of object is predicted to move to the moving area, the driver does not see the second type of object, and the notification information has been added to the second type of object in the correlation information after the driver has seen the second type of object through the notification.

9. A notification control method that is performed by a computer, the notification control method comprising:

setting a moving area including a trajectory along which a mobile object is scheduled to move with behavior of the mobile object and a surrounding area near the mobile object when the mobile object moves straight, turns right, or turns left;

controlling an information provision device configured to provide a driver of the mobile object with information such that the driver is notified of presence of a first type of object when a first type of object is present in the surrounding area and the driver does not see the first type of object; and controlling the information provision device such that the driver is re-notified of the first type of object when the first type of object is present in the moving area and the driver does not see the first type of object after the driver has seen the first type of object through the notification.

10. A non-transitory computer storage medium storing a program, the program causing a computer perform:

a process of setting a moving area including a trajectory along which a mobile object is scheduled to move with behavior of the mobile object and a surrounding area near the mobile object when the mobile object moves straight, turns right, or turns left;

a process of controlling an information provision device configured to provide a driver of the mobile object with information such that the driver is notified of presence of a first type of object when a first type of object is present in the surrounding area and the driver does not see the first type of object; and a process of controlling the information provision device such that the driver is re-notified of the first type of object when the first type of object is present in the moving area and the driver does not see the first type of object after the driver has seen the first type of object through the notification.

* * * * *